(12) United States Patent
Kameyama

(10) Patent No.: US 8,447,128 B2
(45) Date of Patent: May 21, 2013

(54) IMAGE PROCESSING SYSTEM

(75) Inventor: Hirokazu Kameyama, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 78 days.

(21) Appl. No.: 12/899,373

(22) Filed: Oct. 6, 2010

(65) Prior Publication Data
US 2011/0019910 A1  Jan. 27, 2011

Related U.S. Application Data

(63) Continuation of application No. PCT/JP2009/001599, filed on Apr. 7, 2009.

(30) Foreign Application Priority Data

| Apr. 7, 2008 | (JP) | 2008-099322 |
| Apr. 8, 2008 | (JP) | 2008-100746 |
| Apr. 8, 2008 | (JP) | 2008-100747 |
| Apr. 3, 2009 | (JP) | 2009-091518 |

(51) Int. Cl.
*G06K 9/40* (2006.01)
*G06K 9/00* (2006.01)

(52) U.S. Cl.
USPC .......................... 382/254; 382/163

(58) Field of Classification Search
USPC ................ 382/254, 163, 167, 282, 291, 298
See application file for complete search history.

(56) References Cited

U.S. PATENT DOCUMENTS

| 6,327,306 | B1 | 12/2001 | Sugiyama |
| 6,820,137 | B2 | 11/2004 | Nakamura et al. |
| 7,068,835 | B1 * | 6/2006 | Ban et al. ................. 382/154 |
| 7,885,477 | B2 * | 2/2011 | Ito et al. ................... 382/254 |
| 2005/0036712 | A1 * | 2/2005 | Wada ...................... 382/305 |
| 2006/0280380 | A1 | 12/2006 | Li |
| 2007/0014483 | A1 | 1/2007 | Ohara et al. |
| 2007/0201750 | A1 | 8/2007 | Ito et al. |
| 2007/0223830 | A1 | 9/2007 | Ono |
| 2008/0117975 | A1 | 5/2008 | Sasai et al. |

FOREIGN PATENT DOCUMENTS

| EP | 0 684 736 A3 | 11/1995 |
| JP | 63-78674 A | 4/1988 |
| JP | 5-316491 A | 11/1993 |
| JP | 8-205149 A | 8/1996 |
| JP | 8-205168 A | 8/1996 |
| JP | 9-84006 A | 3/1997 |
| JP | 10-12678 A | 5/1998 |
| JP | 2000-306095 A | 5/2000 |

(Continued)

*Primary Examiner* — Yon Couso
(74) *Attorney, Agent, or Firm* — Birch, Stewart, Kolasch & Birch, LLP

(57) ABSTRACT

An image processing system capable of reducing an operation time required to generate a high image quality image, includes an image obtaining section that obtains an input image having been captured; a characteristic region information obtaining section that obtains information indicating a characteristic region in the input image; a model storage section that stores a model representing an object by a character parameter; an image generating section that converts an image of an object included in the characteristic region in the input image into a high image quality image having an image quality higher than an image quality of the input image, by adapting the image of the object included in the characteristic region in the input image to the model; and an output section that outputs an image including the high image quality image and an image other than the characteristic region.

23 Claims, 26 Drawing Sheets

FOREIGN PATENT DOCUMENTS

| | | |
|---|---|---|
| JP | 2000-306095 A | 11/2000 |
| JP | 2002-016920 A | 1/2002 |
| JP | 2002-170112 A | 6/2002 |
| JP | 2004-072555 A | 3/2004 |
| JP | 2004-102359 A | 4/2004 |
| JP | 2005-516553 A | 6/2005 |
| JP | 2005-284636 A | 10/2005 |
| JP | 2006-174415 A | 6/2006 |
| JP | 2006-295303 A | 10/2006 |
| JP | 2006-350498 A | 12/2006 |
| JP | 2006-350769 A | 12/2006 |
| JP | 2007-66227 A | 3/2007 |
| JP | 2007-226655 A | 9/2007 |
| JP | 2007-257585 A | 10/2007 |
| WO | 01/91467 A1 | 11/2001 |
| WO | 03/065708 A1 | 8/2003 |
| WO | 2006/025339 A1 | 3/2006 |
| WO | 2007/001026 A1 | 1/2007 |

\* cited by examiner

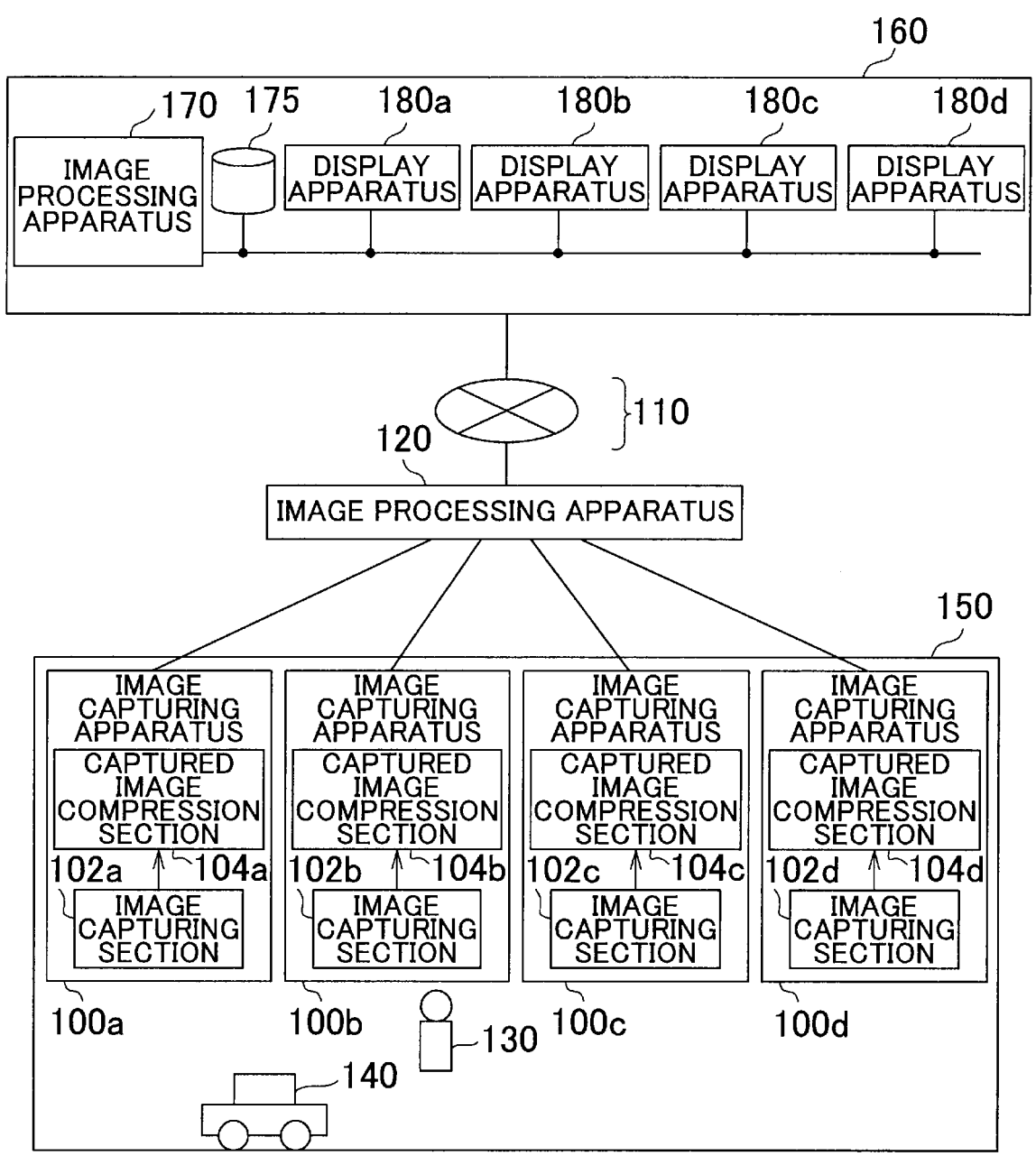
F I G . 1

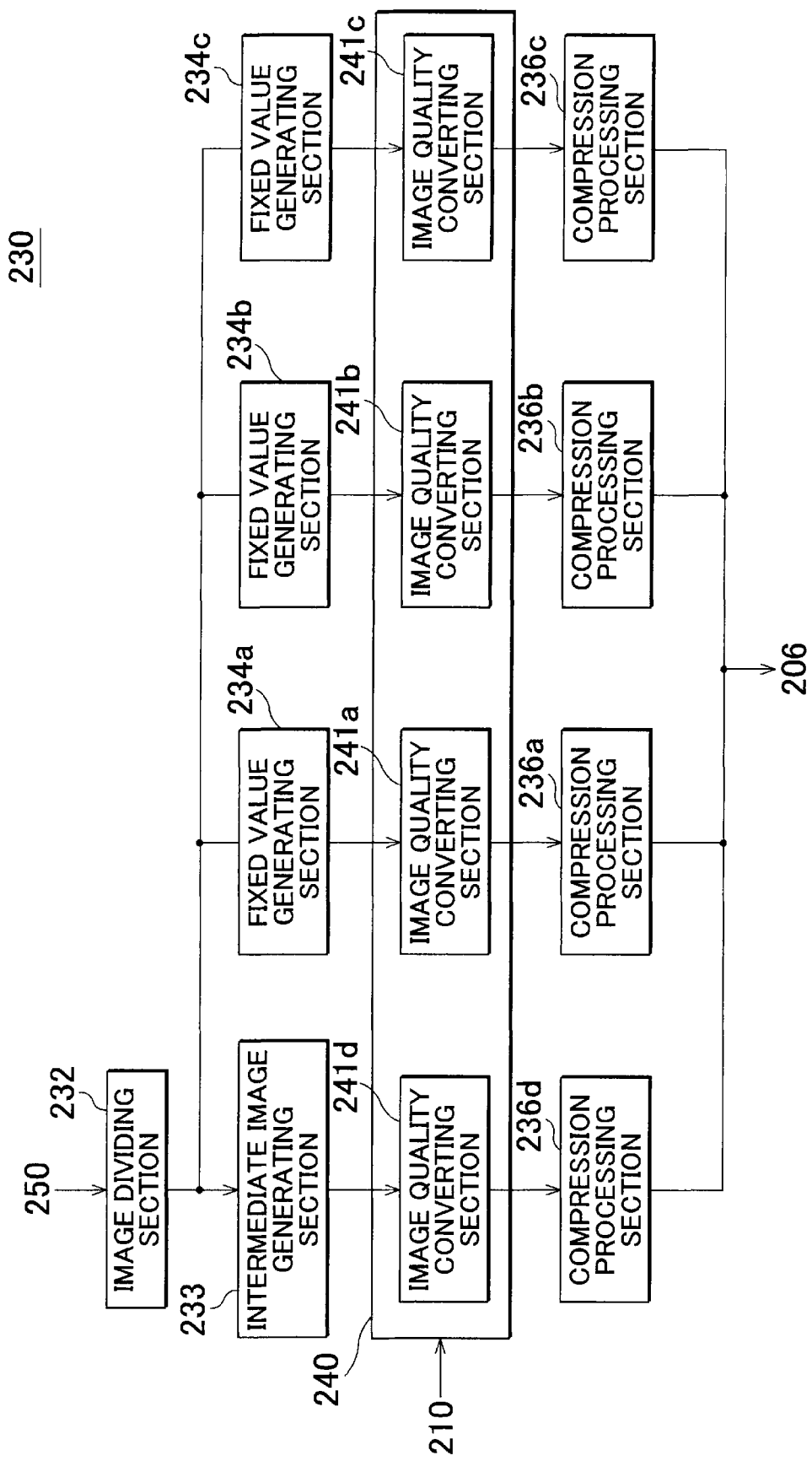
F I G. 3

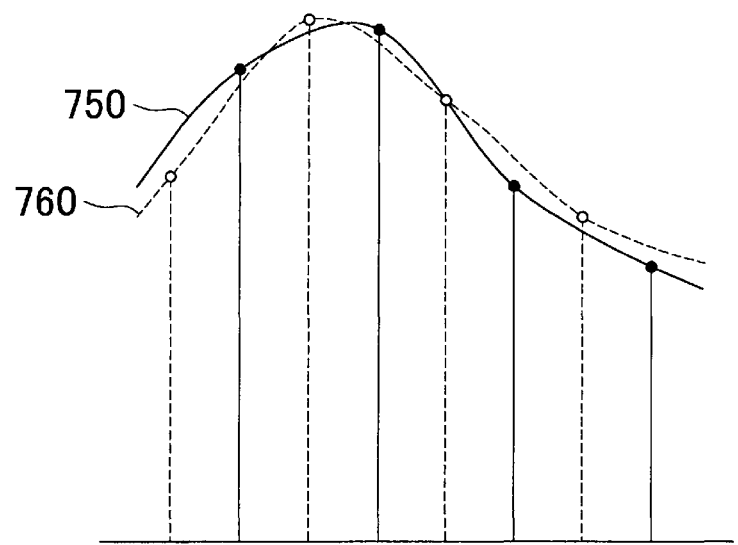
F I G . 7

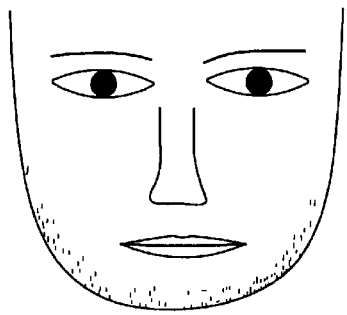
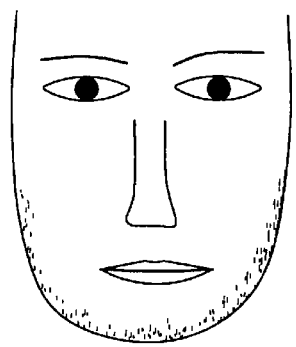
F I G. 11

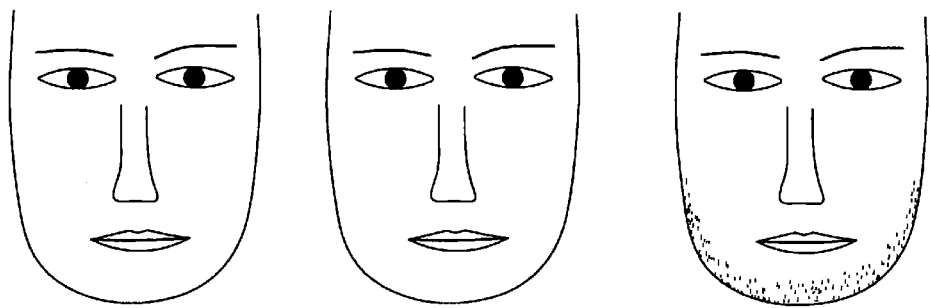
F I G . 12A
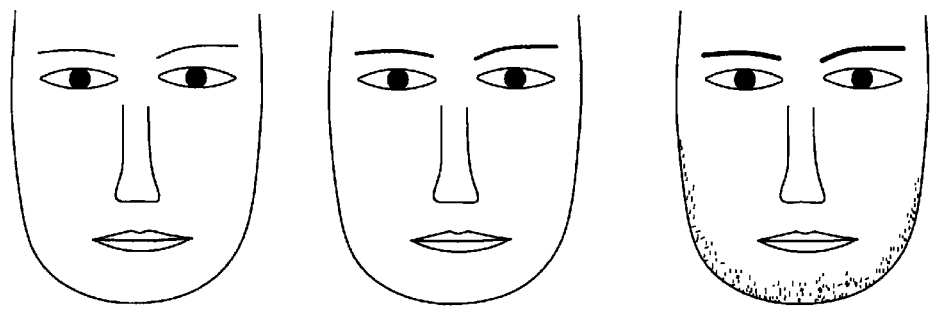
F I G . 12B

| DIRECTION / EXPRESSION | FRONT | RIGHT | LEFT | UPPER | LOWER | BACK |
|---|---|---|---|---|---|---|
| DELIGHT | DELIGHT-FRONT M | DELIGHT-RIGHT M | DELIGHT-LEFT M | DELIGHT-UPPER M | DELIGHT-LOWER M | DELIGHT-BACK M |
| ANGER | ANGER-FRONT M | ANGER-RIGHT M | ANGER-LEFT M | ANGER-UPPER M | ANGER-LOWER M | ANGER-BACK M |
| SORROW | SORROW-FRONT M | SORROW-RIGHT M | SORROW-LEFT M | SORROW-UPPER M | SORROW-LOWER M | SORROW-BACK M |
| PLEASURE | PLEASURE-FRONT M | PLEASURE-RIGHT M | PLEASURE-LEFT M | PLEASURE-UPPER M | PLEASURE-LOWER M | PLEASURE-BACK M |
| SOBER FACE | SOBER FACE-FRONT M | SOBER FACE-RIGHT M | SOBER FACE-LEFT M | SOBER FACE-UPPER M | SOBER FACE-LOWER M | SOBER FACE-BACK M |

F I G. 13

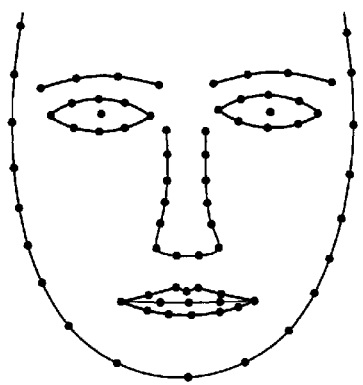
F I G. 20

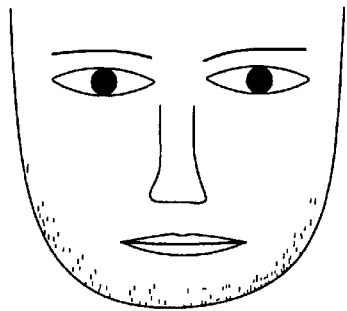
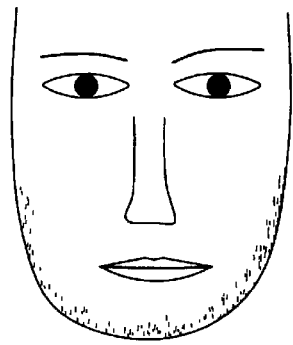
F I G . 22

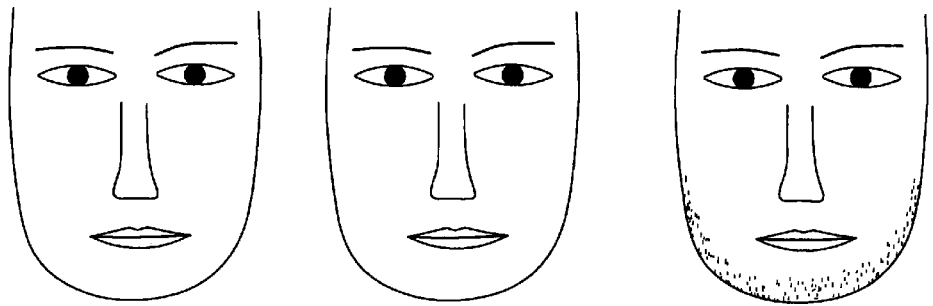
F I G. 23A
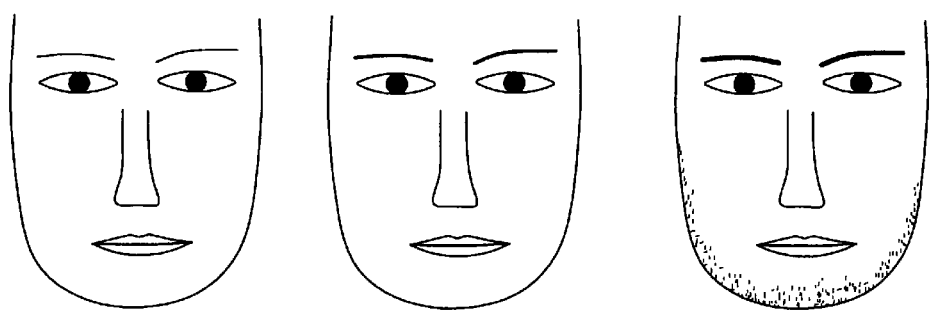
F I G. 23B

| DIRECTION / EXPRESSION | FRONT | RIGHT | LEFT | UPPER | LOWER | BACK |
|---|---|---|---|---|---|---|
| DELIGHT | DELIGHT-FRONT M | DELIGHT-RIGHT M | DELIGHT-LEFT M | DELIGHT-UPPER M | DELIGHT-LOWER M | DELIGHT-BACK M |
| ANGER | ANGER-FRONT M | ANGER-RIGHT M | ANGER-LEFT M | ANGER-UPPER M | ANGER-LOWER M | ANGER-BACK M |
| SORROW | SORROW-FRONT M | SORROW-RIGHT M | SORROW-LEFT M | SORROW-UPPER M | SORROW-LOWER M | SORROW-BACK M |
| PLEASURE | PLEASURE-FRONT M | PLEASURE-RIGHT M | PLEASURE-LEFT M | PLEASURE-UPPER M | PLEASURE-LOWER M | PLEASURE-BACK M |
| SOBER FACE | SOBER FACE-FRONT M | SOBER FACE-RIGHT M | SOBER FACE-LEFT M | SOBER FACE-UPPER M | SOBER FACE-LOWER M | SOBER FACE-BACK M |

FIG. 24

IMAGE PROCESSING SYSTEM

CROSS REFERENCE TO RELATED APPLICATION

This application is a Continuation of PCT International Application No. PCT/JP2009/001599 filed on Apr. 7, 2009, which claims priority under 35 U.S.C. 119(a) to Patent Application Nos. 2008-99322; 2008-100746; 2008-100747 and 2009-91518 filed in Japan, on Apr. 7, 2008; Apr. 8, 2008; Apr. 8, 2008 and Apr. 3, 2009; respectively. The entire contents of all of the above applications and of JP Application No. 2008-98761, filed Apr. 4, 2008, are hereby incorporated by reference into the present application.

The contents of the following Japanese patent applications are incorporated herein by reference, NO. 2008-98761 filed on Apr. 4, 2008, NO. 2008-99322 filed on Apr. 7, 2008, NO. 2008-100746 filed on Apr. 8, 2008, NO. 2008-100747 filed on Apr. 8, 2008, and NO. 2009-91518 filed on Apr. 3, 2009.

BACKGROUND

1. Technical Field

The present invention relates to an image processing system.

2. Related Art

A reconstruction method for reconstructing or restoring a low resolution video or the like obtained by a low resolution video inputting apparatus, to a level obtainable by a high resolution video inputting apparatus is known (e.g., by Patent Document No. 1). A monitored video recording system is also known for generating a high image quality image in which the details of the subject can be confirmed while restraining the processing time by using an apparatus such as a camera used in an existing monitored video recording system as it is (e.g., Patent Document No. 2).

Still more, a method of encoding and decoding an image of a face using a three-dimensional facial model and a fixed face resolution is known (e.g., Patent Document No. 3). In addition, an image encoding apparatus for transmitting, in advance, a main image and a plurality of sub-images representing change in a mouth portion in the main image, and thereafter transmitting a encoding language for designating which of the plurality of sub-images should be selected to be combined on the main image for reproducing a moving image is known (e.g., Patent Document No. 4).

The following shows the specifics of the patent documents cited above.
Patent Document No. 1: Japanese Patent Application Publication No. 2005-20761
Patent Document No. 2: Japanese Patent Application Publication No. 2005-150808
Patent Document No. 3: Japanese Patent Application Publication No. 10-228544
Patent Document No. 4: Japanese Patent No. 2753599

SUMMARY

However, when the entire region of an image is reconstructed or rendered in high image quality, the amount of operation incurred for the processing will increase.

Therefore, it is a first aspect of the innovations herein to provide an image processing system including: an image obtaining section that obtains an input image having been captured; a characteristic region information obtaining section that obtains information indicating a characteristic region in the input image; a model storage section that stores a model representing an object by a character parameter; an image generating section that converts an image of an object included in the characteristic region in the input image into a high image quality image having an image quality higher than an image quality of the input image, by adapting the image of the object included in the characteristic region in the input image to the model; and an output section that outputs an image including the high image quality image and an image of a region other than the characteristic region.

The image processing system may further include: a second model storage section that stores a second model representing an object by a character parameter; a characteristic region detecting section that detects a characteristic region from a captured image; a parameter value calculating section that calculates a value of a character parameter of a second model representing an object included in an image of the characteristic region in the captured image, by adapting the image of the object included in the image of the characteristic region in the captured image to the second model stored in the second model storage section; an intermediate output section that outputs the value of the character parameter calculated by the parameter value calculating section and an image of a region other than the characteristic region in the captured image; an intermediate image obtaining section that obtains the image of the region other than the characteristic region in the captured image whose image quality has been lowered and the value of the character parameter outputted from the intermediate output section; an intermediate image generating section that generates the image of the object included in the image of the characteristic region in the captured image, from the second model based on the value of the character parameter; and an image output section that outputs an image obtained by combining the image of the object generated from the second model and the image of the region other than the characteristic region obtained by the intermediate image obtaining section, where the image obtaining section obtains the image outputted from the image output section as the input image.

Here, an arrangement is possible in which the image obtaining section obtains an input moving image including a plurality of moving image constituting images, the characteristic region information obtaining section obtains information indicating a position of a characteristic region in each of the plurality of moving image constituting images, the image processing system further includes a characteristic region selecting section that selects a first characteristic region and a second characteristic region having correlation higher than a value determined in advance, from among the characteristic regions of the plurality of moving image constituting images, and the image generating section converts an image of an object included in the first characteristic region and an image of an object included in the second characteristic region into a first high image quality image and a second high image quality image, by respectively adapting the image of the object included in the first characteristic region and the image of the object included in the second characteristic region to the model, and generates the high image quality image having a higher resolution than the image of the object included in the first characteristic region and the image of the object included in the second characteristic region, by using the first high image quality image, the second high image quality image, and a difference in position between the first characteristic region and the second characteristic region.

According to a second aspect of the innovations herein, provided is an image processing method including: obtaining an input image having been captured; obtaining information indicating a characteristic region in the input image; storing a model representing an object by a character parameter; converting an image of an object included in the characteristic region in the input image into a high image quality image having an image quality higher than an image quality of the input image, by adapting the image of the object included in the characteristic region in the input image to the model; and outputting an image including the high image quality image and an image of a region other than the characteristic region.

A computer readable medium storing therein a program for an image processing system, the program causing a computer to function as: an image obtaining section that obtains an input image having been captured; a characteristic region information obtaining section that obtains information indicating a characteristic region in the input image; a model storage section that stores a model representing an object by a character parameter; an image generating section that converts an image of an object included in the characteristic region in the input image into a high image quality image having an image quality higher than an image quality of the input image, by adapting the image of the object included in the characteristic region in the input image to the model; and an output section that outputs an image including the high image quality image and an image of a region other than the characteristic region.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 1 shows an example of an image processing system 10 according to an embodiment.

FIG. 3 shows an example of a block configuration of a compression section 230.

FIG. 7 shows an example of intermediate image generating processing performed by an intermediate image generating section 233.

FIG. 11 shows an example of an image obtained by converting a sample image into an average facial form.

FIG. 12A and FIG. 12B schematically show an example of change in pixel value when a weighting factor q is changed.

FIG. 13 shows, in table format, an exemplary model stored in a model storage section 350.

FIG. 20 shows an example of a characteristic point in a human face.

FIG. 22 shows an example of an image obtained by converting a sample image into an average facial form.

FIG. 23A and FIG. 23B schematically show an example of change in pixel value when a weighting factor q is changed.

FIG. 24 shows, in table format, an example of a model stored in a model storage section 2270 and a model storage section 2350.

DESCRIPTION OF EXEMPLARY EMBODIMENTS

Figure 2:
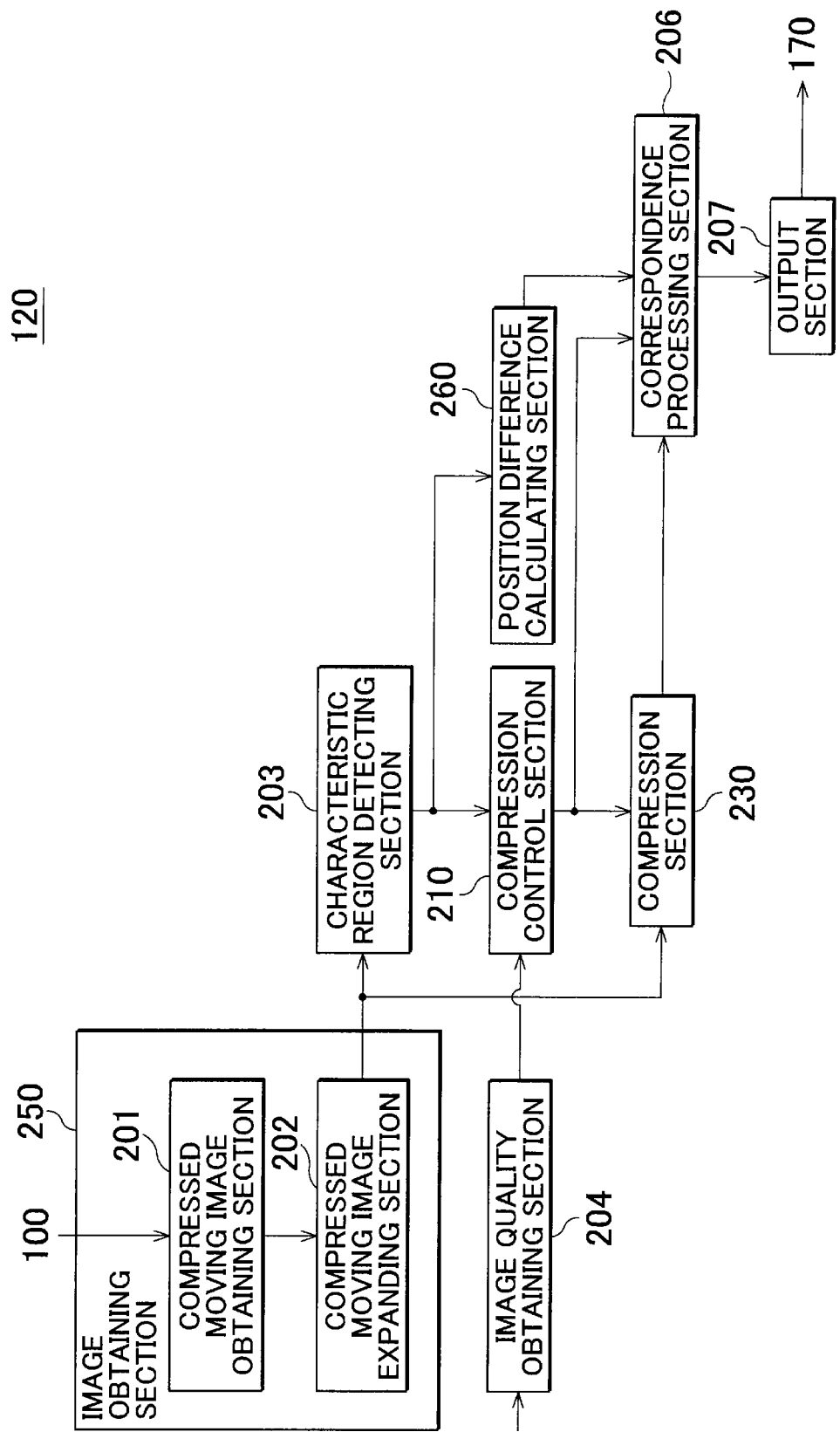
FIG. 2 shows an example of a block configuration of an image processing apparatus 120.

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

FIG. 1 shows an example of an image processing system 10 according to an embodiment. The image processing system 10 can function as a monitoring system as explained below.

The image processing system 10 includes a plurality of image capturing apparatuses 100a-d (hereinafter collectively referred to as "image capturing apparatus 100") for capturing an image of a monitored space 150, an image processing apparatus 120 for processing the images captured by the image capturing apparatus 100, a communication network 110, an image processing apparatus 170, an image DB 175, and a plurality of display apparatuses 180a-d (hereinafter collectively referred to as "display apparatus 180"). The image processing apparatus 170 and the display apparatus 180 are provided in a space 160 different from the monitored space 150.

The image capturing apparatus 100a includes an image capturing section 102a and a captured image compression section 104a. The image capturing section 102a captures a plurality of images by successively capturing the monitored space 150. Note that the images captured by the image capturing section 102a may be images in RAW format. The captured image compression section 104a generates captured moving image data by synchronizing the images in RAW format captured by the image capturing section 102a, and compressing a captured moving image including the plurality of captured images obtained by the synchronization, using MPEG encoding or the like. In this way, the image capturing apparatus 100a generates captured moving image data by encoding the captured moving image obtained by capturing the image of the monitored space 150. The image capturing apparatus 100a outputs the captured moving image data to the image processing apparatus 120.

Since the image capturing apparatuses 100b, 100c, and 100d respectively have the same configuration as that of the image capturing apparatus 100a, the explanation of each constituting element of the image capturing apparatuses 100b, 100c, and 100d is not provided in the following. The image processing apparatus 120 obtains, from each image capturing apparatus 100, the captured moving image data generated by each image capturing apparatus 100.

Then, the image processing apparatus 120 obtains a captured moving image by decoding the captured moving image data obtained from the image capturing apparatus 100. The image processing apparatus 120 detects, from each of a plurality of captured images included in the obtained captured moving image, a plurality of characteristic regions having different characteristic types, such as a region including a person 130, a region including a moving body 140 such as a vehicle, and so on. The image processing apparatus 120 may then compress the images of the characteristic regions at degrees corresponding to the characteristic types, and compress the image of the region other than the characteristic regions, at a degree higher than the compression degrees used in compressing the images of the characteristic regions.

Note that the image processing apparatus 120 reduces a background region that is a region other than characteristic regions in a captured image, to be smaller than the characteristic regions. During this process, the image processing apparatus 120 calculates a positional misalignment of the background region among the plurality of captured images, using the captured images before the reduction.

Then, the image processing apparatus 120 generates characteristic region information including information identifying the characteristic regions detected from the captured images as well as information indicating the misalignment. The image processing apparatus 120 transmits the characteristic region information attached to the compressed moving image data, to the image processing apparatus 170 via the communication network 110.

The image processing apparatus 170 receives, from the image processing apparatus 120, the compressed moving image data to which the characteristic region information is attached. The image processing apparatus 170 expands the received compressed moving image data using the attached characteristic region information to generate the moving image for display, and supplies the generated moving image for display, to the display apparatus 180. The display apparatus 180 displays the moving image for display, having been supplied from the image processing apparatus 170.

Note that the image processing apparatus 170 enlarges the reduced image of the background region, and overlaps the image of the enlarged image of the background region by displacing it by the positional misalignment detected by the image processing apparatus 120. In this way, the image processing apparatus 170 generates a high resolution image of the background region, using the reduced image of the background region in the plurality of captured images. In addition, the image processing apparatus 170 generates a high resolution image of the characteristic region, by using the difference in position of the characteristic region detected by the image processing apparatus 120. In addition, the image processing apparatus 170 may generate a high resolution image of the object captured in the image of the characteristic region in the captured image, by adapting it to a mathematical model representing an object using a character parameter.

The image processing apparatus 170 may record, in the image DB 175, the compressed moving image data in association with the characteristic region information attached to the compressed moving image data. The image processing apparatus 170 may read the compressed moving image data and the characteristic region information from the image DB 175, in response to a request from the display apparatus 180, generate a moving image for display by expanding the read compressed moving image data using the characteristic region information, and supply the generated moving image for display, to the display apparatus 180.

Note that the characteristic region information may be text data including the position, the size, and the number of characteristic regions, as well as identification information identifying the captured image from which the characteristic regions are detected. The characteristic region information may also be the above text data provided with processing such as compression and encryption. The image processing apparatus 170 identifies a captured image satisfying various search conditions, based on the position, the size, the number of characteristic regions included in the characteristic region information. The image processing apparatus 170 may decode the identified captured image, and provide the decoded image to the display apparatus 180.

In this way, the image processing system 10 records each characteristic region in association with a moving image, and so can quickly search the moving image for a group of captured images matching a predetermined condition, to perform random access. In addition, the image processing system 10 can decode only a group of captured images matching a predetermined condition, enabling to display a partial moving image matching a predetermined condition quickly in response to a playback request.

FIG. 2 shows an example of a block configuration of an image processing apparatus 120. The image processing apparatus 120 includes an image obtaining section 250, an image quality obtaining section 204, a characteristic region detecting section 203, a position difference calculating section 260, a compression control section 210, a compression section 230, a correspondence processing section 206, and an output section 207. The image obtaining section 250 includes a compressed moving image obtaining section 201 and a compressed moving image expanding section 202.

The compressed moving image obtaining section 201 obtains the compressed moving image. Specifically, the compressed moving image obtaining section 201 obtains the encoded captured moving image data generated by the image capturing apparatus 100. The compressed moving image expanding section 202 expands the captured moving image data obtained by the compressed moving image obtaining section 201, and generates a plurality of captured images included in the captured moving image. Specifically, the compressed moving image expanding section 202 decodes the encoded captured moving image data obtained by the compressed moving image obtaining section 201, and generates the plurality of captured images included in the captured moving image. A captured image included in the captured moving image may be a frame image or a field image. Note that a captured image in the present embodiment may be an example of a moving image constituting image of the present invention. In this way, the image obtaining section 250 obtains the plurality of moving images captured by each of the plurality of image capturing apparatuses 100.

The plurality of captured images obtained by the compressed moving image expanding section 202 are supplied to the characteristic region detecting section 203 and to the compression section 230. The characteristic region detecting section 203 detects a characteristic region from a moving image including a plurality of captured images. Specifically, the characteristic region detecting section 203 detects a characteristic region from each of the plurality of captured images. Note that the above-described captured moving image may be an example of a moving image in the following explanation.

For example, the characteristic region detecting section 203 detects, as a characteristic region, an image region of a moving image, within which the image changes. Specifically, the characteristic region detecting section 203 may detect, as a characteristic region, an image region including a moving object. Note that the characteristic region detecting section 203 may detect a plurality of characteristic regions having different characteristic types from each other, from each of the plurality of captured images. Note that the type of a characteristic may be defined using a type of an object (e.g., a person, a moving body) as an index. The type of the object may be determined based on the degree of matching of the form of the objects or the color of the objects. In this way, the characteristic region detecting section 203 may detect, from a plurality of captured images, a plurality of characteristic regions respectively including different types of objects.

For example, the characteristic region detecting section 203 may extract an object that matches a predetermined form pattern at a degree of matching higher than a predetermined degree of matching, from each of the plurality of captured images, and detect the regions in the captured images that include the extracted object, as characteristic regions sharing the same characteristic type. A plurality of form patterns may be determined for a plurality of characteristic types respectively. An exemplary form pattern is a form pattern of a face of a person. Note that a plurality of face patterns may be provided for a plurality of people respectively. Accordingly, the characteristic region detecting section 203 may detect different regions including different people from each other, as different characteristic regions. Note that the characteristic region detecting section 203 may also detect, as characteristic regions, regions including a part of a person such as head of a person, hand of a person, or at least a part of a living body other than a human being, not limited to a face of a person mentioned above. Note that a living body includes certain tissue existing inside the living body, such as tumor tissue or blood vessels in the living body. The characteristic region detecting section 203 may also detect, as characteristic regions, regions including money, a card such as a cache card, a vehicle, or a number plate of a vehicle, other than a living body.

In addition to the pattern matching using a template matching, the characteristic region detecting section 203 may also perform characteristic region detection based on the learning result such as by machine learning (e.g. AdaBoost) described in Japanese Patent Application Publication No. 2007-188419. For example, the characteristic region detecting section 203 uses the image feature value extracted from the image of a predetermined subject and the image feature value extracted from the image of a subject other than the predetermined subject, to learn about the characteristic in the image feature value extracted from the image of the predetermined subject. Then, the characteristic region detecting section 203 may detect, as a characteristic region, a region from which the image feature value corresponding to the characteristic matching the learned characteristic is extracted. Accordingly, the characteristic region detecting section 203 can detect, as a characteristic region, a region including a predetermined subject.

In this way, the characteristic region detecting section 203 detects a plurality of characteristic regions from a plurality of captured images included in each of a plurality of moving images. The characteristic region detecting section 203 supplies information indicating a detected characteristic region to the compression control section 210. Information indicating a characteristic region includes coordinate information of a characteristic region indicating a position of a characteristic region, type information indicating a type of a characteristic region, and information identifying a captured moving image from which a characteristic region is detected. In this way, the characteristic region detecting section 203 detects a characteristic region in a moving image.

The position difference calculating section 260 calculates the position difference of an object among a plurality of captured images included in a moving image. Then, the position difference calculating section 260 supplies the calculated positional difference, to the correspondence processing section 206. Note that the characteristic region detecting section 203 may detect the position of a characteristic region for each sub-pixel in the captured images obtained by the image obtaining section 250. As a result, the position difference calculating section 260 can calculate the position difference for each sub-pixel.

The compression control section 210 controls compression of a moving image performed by the compression section 230 for each characteristic region, based on the information indicating a characteristic region obtained from the characteristic region detecting section 203. Note that the compression section 230 may compress the captured image by changing the degree of compression between the characteristic regions in the captured image and the region other than the characteristic regions in the captured image. For example, the compression section 230 compresses the captured image by lowering the resolution of the region other than the characteristic regions in the captured image included in the moving image. In this way, the compression section 230 compresses each of image regions in a captured image depending on its degree of importance. Note that the concrete compression operation inside the compression section 230 is detailed later.

The image quality obtaining section 204 obtains an image quality in association with each characteristic of the characteristic region. Specifically, the image quality obtaining section 204 may obtain, from outside of the image processing apparatus 120, the image quality in association with the characteristic of the characteristic region. More specifically, the image obtaining section 204, from outside of the image processing apparatus 120, the image quality in association with the type of the characteristic region. Some examples of the image quality are the resolution, the number of gradations, the dynamic range, or the number of included colors. The image quality information obtained by the image quality obtaining section 204 is supplied to the compression section 230 via the compression control section 210. Then, the compression section 230 reduces the image quality of the images of the plurality of characteristic regions in the captured images, into the image quality obtained by the image quality obtaining section 204 in association with the characteristic of each characteristic region.

The correspondence processing section 206 associates, with a captured image, information identifying a characteristic region detected from the captured image and information indicating a position difference detected by the position difference calculating section 260. Specifically, the correspondence processing section 206 associates, with a compressed moving image including a captured image as a moving image constituting image, information identifying a characteristic region detected from the captured image and information indicating a position difference detected by the position difference calculating section 260. The output section 207 outputs, to the image processing apparatus 170, the compressed moving image associated with the information identifying the characteristic region and the information identifying the position difference by the correspondence processing section 206. In this way, the compression section 230 generates the captured image to be inputted into the image processing apparatus 170, by reducing the image quality of the images of the plurality of characteristic regions in the captured images, to the image quality obtained by the image quality obtaining section 204 for the characteristic of each characteristic region.

FIG. 3 shows an example of a block configuration of a compression section 230. The compression section 230 includes an image dividing section 232, an intermediate image generating section 233, a plurality of fixed value generating sections 234a-c (hereinafter occasionally collectively referred to as "fixed value generating section 234"), an image quality converting unit 240 that includes a plurality of image quality converting sections 241a-d (hereinafter collectively referred to as "image quality converting section 241"), and a plurality of compression processing sections 236a-d (hereinafter occasionally collectively referred to as "compression processing section 236").

The image dividing section 232 obtains a plurality of captured images from the image obtaining section 250. Then, the image dividing section 232 divides characteristic regions from a background region other than the characteristic regions, in the plurality of captured images. Specifically, the image dividing section 232 divides each of a plurality of characteristic regions from a background region other than the characteristic regions, in the plurality of captured images. In this way, the image dividing section 232 divides characteristic regions from a background region in each of the plurality of captured images.

The compression processing section 236 compresses a characteristic region image that is an image of a characteristic region and a background region image that is an image of a background region at different degrees from each other. Specifically, the compression processing section 236 compresses a characteristic region moving image including a plurality of characteristic region images, and a background region moving image including a plurality of background region images, at different degrees from each other.

Specifically, the image dividing section 232 divides a plurality of captured images to generate a characteristic region moving image for each of a plurality of characteristic types. The fixed value generating section 234 generates, for each characteristic region image included in a plurality of characteristic region moving images respectively generated according to characteristic types, a fixed value of a pixel value of a region other than the characteristic region corresponding to the characteristic. Specifically, the fixed value generating section 234 sets the pixel value of the region other than the characteristic regions to be a predetermined pixel value.

The intermediate image generating section 233 generates an intermediate image representing an image of a background region, from the images of the background region in a part of the plurality of captured images. Note that the intermediate image generating section 233 generates the intermediate image based on the pixel values between the pixels of the background region in the other captured images, based on the image of the background region in the part of the captured images and the position difference calculated by the position difference calculating section 260. Note that the intermediate image generating section 233 generates the intermediate image from the part of the captured images and supplies the generated intermediate image to the image quality converting section 241d, as well as supplying the other captured images as they are to the image quality converting section 241 without generating an intermediate image for them. Note that the intermediate image generating method performed by the intermediate image generating section 233 will be detailed later.

The image quality converting section 241 converts the image quality of an image of a characteristic region and of an image of a background region. For example, the image quality converting section 241 converts at least one of the resolution, the number of gradations, the dynamic range, or the number of included colors, for each of images of characteristic regions and an image of a background region resulting from the division. Then, the compression processing section 236 compresses the plurality of characteristic region moving images for each characteristic type. For example, the compression processing section 236 MPEG compresses the plurality of characteristic region moving images for each characteristic type.

Note that the fixed value generating sections 234a, 234b, and 234c respectively perform the fixed value processing on the characteristic region moving image of the first characteristic type, the characteristic region moving image of the second characteristic type, and the characteristic region moving image of the third characteristic type. The image quality converting sections 241a, 241b, 241c, and 241d respectively convert the image qualities of the characteristic region moving image of the first characteristic type, the characteristic region moving image of the second characteristic type, the characteristic region moving image of the third characteristic type, and the background region moving image. Then, the compression processing sections 236a, 236b, 236c, and 236d compress the characteristic region moving image of the first characteristic type, the characteristic region moving image of the second characteristic type, the characteristic region moving image of the third characteristic type, and the background region moving image.

Note that the compression processing sections 236a-c compress a characteristic region moving image at a predetermined degree according to a characteristic type. For example, the compression processing section 236 may convert characteristic region moving images into respectively different resolutions predetermined according to characteristic types, and compress the converted characteristic region moving images. When compressing the characteristic region moving images using MPEG encoding, the compression processing section 236 may compress the characteristic region moving images with respectively different quantization parameters predetermined according to characteristic types.

Note that the compression processing section 236d compresses the background region moving image. Note that the compression processing section 236d may compress a background region moving image at a degree higher than any degree adopted by the compression processing sections 236a-c. The characteristic region moving images and the background region moving image compressed by the compression processing section 236 are supplied to the correspondence processing section 206.

Since the region other than the characteristic regions has been subjected to the fixed value processing by the fixed value generating section 234, when the compression processing section 236 performs prediction coding such as MPEG encoding, the amount of difference between the image and the predicted image in the region other than the characteristic region can be substantially reduced. Therefore, the compression ratio of the characteristic region moving image can be substantially enhanced.

In this way, by reducing the image quality of the captured image, the compression section 230 generates an image to be an input image to the image processing apparatus 170. Specifically, the compression section 230 generates an image to be an input image to the image processing apparatus 170, such as by reducing the resolution, the number of gradations, and the number of used colors of the captured image. In addition, the compression section 230 may for example generate an image to be an input image to the image processing apparatus 170, by lowering the spatial frequency component in the captured image.

Note that in this drawing, each of the plurality of compression processing sections 236 included in the compression section 230 compresses the images of the plurality of characteristic regions and the image of the background region. However, in another embodiment, the compression section 230 may include a single compression processing section 236, and this single compression processing section 236 may compress the images of the plurality of characteristic regions and the image of the background region at respectively different degrees. For example, an arrangement is possible in which the images of the plurality of characteristic regions and the image of the background region are sequentially supplied in time division to the single compression processing section 236, and the single compression processing section 236 sequentially compresses the images of the plurality of characteristic regions and the image of the background region at respectively different degrees.

Alternatively, a single compression processing section 236 may compress the images of the plurality of characteristic regions and the image of the background region at different degrees from each other, by respectively quantizing the image information of the plurality of characteristic regions and the image information of the background region at different quantization factors from each other. An arrangement is also possible in which the images resulting from converting the images of the plurality of characteristic regions and the image of the background region into respectively different image qualities are supplied to the single compression processing section 236, and the single compression processing section 236 compresses the images of the plurality of characteristic regions and the image of the background region respectively. Note that this image quality conversion may be performed by a single image quality converting unit 240. Also in such an embodiment described above in which a single compression processing section 236 performs quantization using different quantization factors for each of regions and the images converted into different image qualities for each of regions are compressed by a single compression processing section 236, the single compression processing section 236 may compress a single image, or may compress the images divided by the image dividing section 232 respectively as in the present drawing. Note that when a single compression processing section 236 compresses a single image, the dividing processing by the image dividing section 232 and the fixed value processing by the fixed value generating section 234 are unnecessary, and so the compression section 230 does not have to include any image dividing section 232 or fixed value generating section 234.

Figure 4:
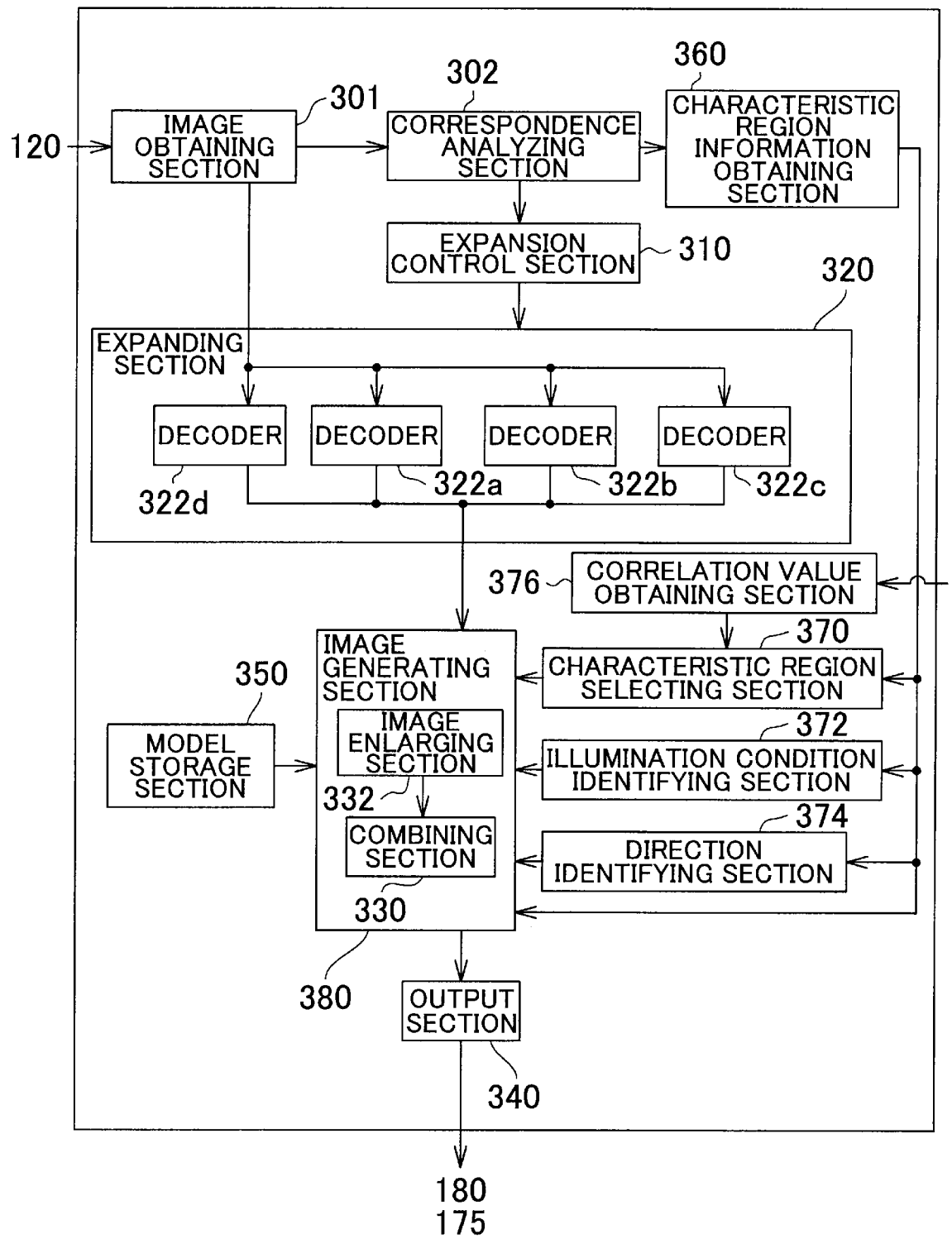
FIG. 4 shows an example of a block configuration of an image processing apparatus 170.

FIG. 4 shows an example of a block configuration of an image processing apparatus 170. The image processing apparatus 170 includes an image obtaining section 301, a correspondence analyzing section 302, an expansion control section 310, an expanding section 320, an image generating section 380, a characteristic region information obtaining section 360, a characteristic region selecting section 370, an illumination condition identifying section 372, a direction identifying section 374, a correlation value obtaining section 376, a model storage section 350, and an output section 340.

The image generating section 380 includes an enlarging section 332 and a combining section 330.

The image obtaining section 301 obtains a compressed moving image compressed by the compression section 230. Specifically, the image obtaining section 301 obtains a compressed moving image including a plurality of characteristic region moving images and a background region moving image. More specifically, the image obtaining section 301 obtains a compressed moving image to which characteristic region information is attached. Note that the compressed moving image may be an example of an input moving image directed to the image processing apparatus 170. In addition, the captured image included in the compressed moving image as a moving image constituting image may be an example of an input image directed to the image processing apparatus 170. In this way, the image obtaining section 301 obtains the captured image whose image quality has been lowered by the compression section 230, as an input image.

The correspondence analyzing section 302 separates the compressed moving image into a plurality of characteristic region moving images and a background region moving image, and characteristic region information, and supplies the plurality of characteristic region moving images and the background region moving image to the expanding section 320. In addition, the correspondence analyzing section 302 analyzes the characteristic region information, and supplies the positions of the characteristic regions and the characteristic types to the expansion control section 310 and the characteristic region information obtaining section 360. In this way, the characteristic region information obtaining section 360 can obtain the information indicating each characteristic region in each of a plurality of captured images (i.e., information indicating the position of each characteristic region).

The expansion control section 310 controls the expanding processing by the expanding section 320, according to the position of the characteristic region and the characteristic type obtained from the correspondence analyzing section 302. For example, the expansion control section 310 controls the expanding section 320 to expand each region of a moving image represented by the compressed moving image, according to a compression method adopted by the compression section 230 in compressing each region of the moving image according to the position of the characteristic region and the characteristic type.

The following explains the operation of each constituting element of the expanding section 320. The expanding section 320 includes a plurality of decoders 322a-d (hereinafter collectively referred to as "decoder 322"). The decoder 322 decodes one of the plurality of characteristic region moving images and the background region moving image, which have been encoded. Specifically, the decoders 322a, 322b, 322c, and 322d respectively decode the first, second, third characteristic region moving images and a background region moving image. The expanding section 320 supplies the first, second, third characteristic region moving images and the background region moving image, which have been decoded, to the image generating section 380.

The image generating section 380 generates a single moving image for display based on the first, second, third characteristic region moving images, the background region moving image, and the characteristic region information. The output section 340 then outputs the characteristic region information obtained from the correspondence analyzing section 302 and the moving image for display to the display apparatus 180 or to the image DB 175. Note that the image DB 175 may record, in a nonvolatile recording medium such as a hard disk, the position, the characteristic type, and the number of characteristic region(s) indicated by the characteristic region information, in association with information identifying the captured image included in the moving image for display.

The characteristic region selecting section 370 selects, from characteristic regions in each of a plurality of captured images, a first characteristic region and a second characteristic region having correlation higher than a predetermined value. Specifically, the correlation value obtaining section 376 obtains a threshold value related to the correlation. Then, the characteristic region selecting section 370 selects, from among the characteristic regions in each of the plurality of moving image constituting images, a first characteristic region and a second characteristic region having correlation higher than the threshold value obtained by the correlation value obtaining section 376.

For example, the characteristic region selecting section 370 may select, from among characteristic regions detected from each of a plurality of captured images, a first characteristic region and a second characteristic region having a degree of matching in image higher than a predetermined value.

The characteristic region selecting section 370 may also select a first characteristic region and a second characteristic region based on the position of the characteristic regions in each of the plurality of a plurality of captured images. For example, the characteristic region selecting section 370 may select a first characteristic region and a second characteristic region, whose moving speed changes in an amount smaller than a predetermined value in the compressed moving image, based on the amount of change in position of the characteristic regions in the plurality of captured images. In addition, the characteristic region selecting section 370 may select a first characteristic region and a second characteristic region, whose moving direction changes in an amount smaller than a predetermined value in an input moving image, based on the direction of change in position of the characteristic regions across the plurality of captured images. The characteristic region selecting section 370 supplies the information indicating the first characteristic region and the second characteristic region having been selected, to the image generating section 380.

The image generating section 380 then generates a high image quality image having a higher resolution than the image of the first characteristic region and the image of the second characteristic region, using the image of the first characteristic region, the image of the second characteristic region, and the difference in position of the first characteristic region and the second characteristic region. For example, the image generating section 380 combines the image of the first characteristic region and the image of the second characteristic region based on the difference in position, to generate a high image quality image. For example, the image generating section 380 generates a high image quality image by overlapping the image of the first characteristic region and the image of the second characteristic region by displacing them by the difference in position.

Note that the characteristic region selecting section 370 may select three or more characteristic regions having correlation higher than a predetermined value, from among the characteristic regions detected from each of a plurality of captured images. The image generating section 380 may generate a high image quality image having resolution higher than the images of the three or more characteristic regions, using the images of the three or more characteristic regions and the difference in position of the three or more characteristic regions.

The image enlarging section 332 enlarges the image of the region other than the characteristic region in a captured image to the same resolution as the high image quality image. The combining section 330 combines the image obtained by the image enlarging section 332 and the high image quality image, to generate a single captured image as a moving image constituting image of a moving image for display. In this way, the image generating section 380 enlarges the image of the region other than the characteristic region in the captured image to the same resolution as the high image quality image, and combines the enlarged image and the high image quality image, thereby generating a single captured image. The image generating section 380 generates a moving image for display which includes a plurality of captured images as moving image constituting images, by performing the above-explained processing to each of the plurality of captured images.

Note that the image generating section 380 may generate a high image quality image by adapting the image of the object included in the characteristic region to a mathematical model. Specifically, the model storage section 350 stores a model representing an object using a character parameter. Specifically, the model storage section 350 stores a model representing an object using a statistical character parameter. For example, the model storage section 350 stores a model representing an object by a principal component (e.g., principal component vector) based on a principal component analysis.

Note that the model storage section 350 may store a model expressing the form of an object by a principal component based on a principal component analysis. In addition, the model storage section 350 may store a model expressing the color of an object by a principal component based on a principal component analysis.

The image generating section 380 adapts the image of the object included in the characteristic region in the captured image to a model, to convert the image of the object included in the characteristic region in the captured image to a high image quality image having a higher image quality than the captured image.

The model storage section 350 stores models of an object viewed from respectively different directions, in association with the respective directions. The direction identifying section 374 identifies the direction in which the object in the characteristic region in the captured image has been captured. Then, the image generating section 380 may convert, into a high image quality image, the image of the object included in the characteristic region in the captured image, by adapting it to the model stored in the model storage section 350 in association with the direction identified by the direction identifying section 374.

The model storage section 350 also stores models of an object illuminated in different illumination conditions, in association with the respective illumination conditions. The illumination condition identifying section 372 identifies the illumination condition under which the object captured in the characteristic region of the input image has been illuminated. Then, the image generating section 380 converts, into a high image quality image, the image of the object included in the characteristic region of the input image, by adapting it to the model stored in the model storage section 350 in association with the illumination condition identified by the illumination condition identifying section 372. In this way, the image generating section 380 generates a high image quality image having resolution higher than the inputted captured image, by adapting the image of the object included in the characteristic region in the inputted captured image to a model.

The output section 340 outputs an image including the high image quality image and the image other than the characteristic region. Specifically, the output section 340 outputs a moving image for display that includes, as a moving image constituting image, a captured image obtained by the combining section 330 in the above-explained manner.

Figure 5:
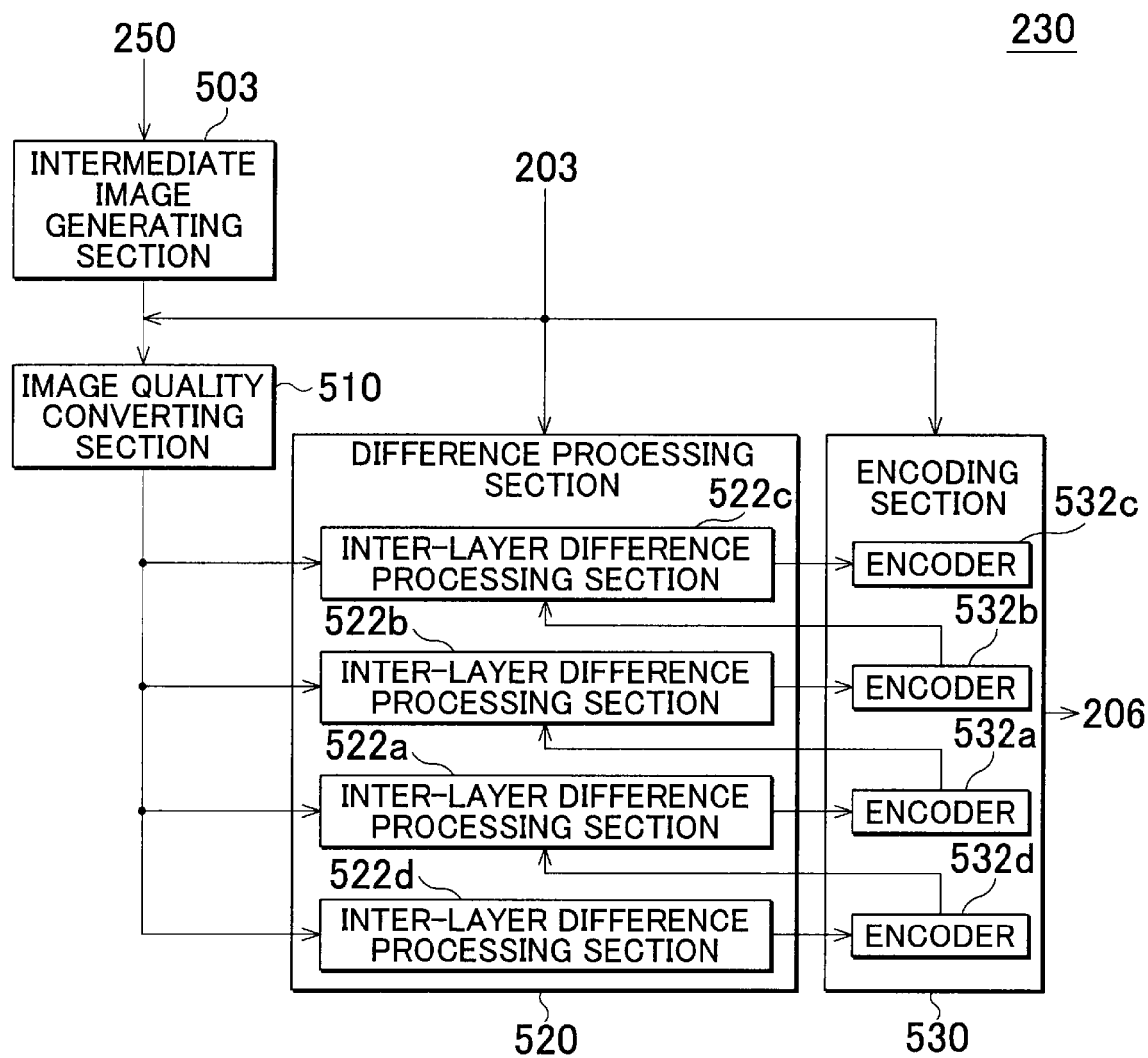
FIG. 5 shows an example of another block configuration of the compression section 230.

FIG. 5 shows an example of another block configuration of the compression section 230. The compression section 230 in the present configuration compresses a plurality of captured images by means of coding processing that is spatio scalable according to the characteristic type.

The compression section 230 in the present configuration includes an intermediate image generating section 503, an image quality converting section 510, a difference processing section 520, and an encoding section 530. The difference processing section 520 includes a plurality of inter-layer difference processing sections 522*a-d* (hereinafter collectively referred to as "inter-layer difference processing section 522"). The encoding section 530 includes a plurality of encoders 532*a-d* (hereinafter collectively referred to as "encoder 532").

The intermediate image generating section 503 obtains a plurality of captured images from the image obtaining section 250. The intermediate image generating section 503 obtains information identifying the characteristic region detected by the characteristic region detecting section 203 and information identifying the characteristic type of the characteristic region. The intermediate image generating section 503 then generates an intermediate image for a part of the captured images by means of processing similar to the processing used by the intermediate image generating section 233, and supplies the generated intermediate image to the inter-layer difference processing section 522*d*. The intermediate image generating section 503 does not generate an intermediate image for the background region in the captured images other than the above-mentioned part of the captured images, and instead, supplies the image of the background region as it is to the image quality converting section 510. In addition, the intermediate image generating section 503 does not generate an intermediate image for the characteristic regions either, and supplies the images of the characteristic regions as they are to the image quality converting section 510. Note that the intermediate image generating section 503 generates the intermediate image by means of the processing similar to the processing adopted by the intermediate image generating section 233, and so its operation is not explained below.

The image quality converting section 510 obtains, from the intermediate image generating section 503, a plurality of captured images including the intermediate image processed by the intermediate image generating section 503. The image quality converting section 510 obtains information identifying the characteristic region detected by the characteristic region detecting section 203 and information identifying the characteristic type of the characteristic region. The image quality converting section 510 then generates the captured images in number corresponding to the number of characteristic types of the characteristic regions, by copying the captured images. The image quality converting section 510 converts the generated captured images into images of resolution according to the respective characteristic types.

For example, the image quality converting section 510 generates a captured image converted into resolution according to a background region (hereinafter referred to as "low resolution image"), a captured image converted into first resolution according to a first characteristic type (hereinafter referred to as "first resolution image"), a captured image converted into second resolution according to a second characteristic type (hereinafter referred to as "second resolution image"), and a captured image converted into third resolution according to a third characteristic type (hereinafter referred to as "third resolution image"). Here, the first resolution image has a higher resolution than the resolution of the low resolution image, and the second resolution image has a higher resolution than the resolution of the first resolution image, and the third resolution image has a higher resolution than the resolution of the second resolution image.

The image quality converting section 510 supplies the low resolution image, the first resolution image, the second resolution image, and the third resolution image, respectively to the inter-layer difference processing section 522*d*, the inter-layer difference processing section 522*a*, the inter-layer difference processing section 522*b*, and the inter-layer difference processing section 522*c*. Note that the image quality converting section 510 supplies a moving image to each of the inter-layer difference processing sections 522 as a result of performing the image quality converting processing to each of the plurality of captured images.

Note that the image quality converting section 510 may convert the frame rate of the moving image supplied to each of the inter-layer difference processing sections 522 according to the characteristic type of the characteristic region. For example, the image quality converting section 510 may supply, to the inter-layer difference processing section 522*d*, the moving image having a frame rate lower than the frame rate of the moving image supplied to the inter-layer difference processing section 522*a*. In addition, the image quality converting section 510 may supply, to the inter-layer difference processing section 522*a*, the moving image having a frame rate lower than the frame rate of the moving image supplied to the inter-layer difference processing section 522*b*, and may supply, to the inter-layer difference processing section 522*b*, the moving image having a frame rate lower than the frame rate of the moving image supplied to the inter-layer difference processing section 522*c*. Note that the image quality converting section 510 may convert the frame rate of the moving image supplied to the inter-layer difference processing section 522, by thinning the captured images according to the characteristic type of the characteristic region. Note that the image quality converting section 510 may perform the similar image conversion to the image quality converting section 241 explained with reference to FIG. 3.

The inter-layer difference processing section 522*d* and the encoder 532*d* perform prediction coding on the background region moving image including a plurality of low resolution images. Specifically, the inter-layer difference processing section 522 generates a differential image representing a difference from the predicted image generated from the other low resolution images. Then, the encoder 532*d* quantizes the conversion factor obtained by converting the differential image into spatial frequency component, and encodes the quantized conversion factor using entropy coding or the like. Note that such prediction coding processing may be performed for each partial region of a low resolution image.

In addition, the inter-layer difference processing section 522*a* performs prediction coding on the first characteristic region moving image including a plurality of first resolution images supplied from the image quality converting section 510. Likewise, the inter-layer difference processing section 522*b* and the inter-layer difference processing section 522*c* respectively perform prediction coding on the second characteristic region moving image including a plurality of second resolution images and on the third characteristic region moving image including a plurality of third resolution images. The following explains the concrete operation performed by the inter-layer difference processing section 522*a* and the encoder 532*a*.

The inter-layer difference processing section 522a decodes the first resolution image having been encoded by the encoder 532d, and enlarges the decoded image to an image having a same resolution as the first resolution. Then, the inter-layer difference processing section 522a generates a differential image representing a difference between the enlarged image and the low resolution image. During this operation, the inter-layer difference processing section 522a sets the differential value in the background region to be 0. Then, the encoder 532a encodes the differential image just as the encoder 532d has done. Note that the encoding processing may be performed by the inter-layer difference processing section 522a and the encoder 532a for each partial region of the first resolution image.

When encoding the first resolution image, the inter-layer difference processing section 522a compares the amount of encoding predicted to result by encoding the differential image representing the difference from the low resolution image and the amount of encoding predicted to result by encoding the differential image representing the difference from the predicted image generated from the other first resolution image. When the latter amount of encoding is smaller than the former, the inter-layer difference processing section 522a generates the differential image representing the difference from the predicted image generated from the other first resolution image. When the encoding amount of the first resolution image is predicted to be smaller as it is without taking any difference with the low resolution image or with the predicted image, the inter-layer difference processing section 522a does not have to calculate the difference from the low resolution image or the predicted image.

Note that the inter-layer difference processing section 522a does not have to set the differential value in the background region to be 0. In this case, the encoder 532a may set the data after encoding with respect to the information on difference in the region other than the characteristic region (hereinafter occasionally referred to as "non-characteristic region") to be 0. For example, the encoder 532a may set the conversion factor after converting to the frequency component to be 0. When the inter-layer difference processing section 522d has performed prediction coding, the motion vector information is supplied to the inter-layer difference processing section 522a. The inter-layer difference processing section 522a may calculate the motion vector for a predicted image, using the motion vector information supplied from the inter-layer difference processing section 522d.

Note that the operation performed by the inter-layer difference processing section 522b and the encoder 532b is substantially the same as the operation performed by the inter-layer difference processing section 522a and the encoder 532a, except that the second resolution image is encoded, and when the second resolution image is encoded, the difference from the first resolution image after encoding by the encoder 532a may be occasionally calculated, and so is not explained below. Likewise, the operation performed by the inter-layer difference processing section 522c and the encoder 532c is substantially the same as the operation performed by the inter-layer difference processing section 522a and the encoder 532a, except that the third resolution image is encoded, and when the third resolution image is encoded, the difference from the second resolution image after encoding by the encoder 532b may be occasionally calculated, and so is not explained below.

As explained above, the image quality converting section 510 generates, from each of the plurality of captured images, a low image quality image and a characteristic region image having a higher image quality than the low image quality image at least in the characteristic region. The difference processing section 520 generates a characteristic region differential image being a differential image representing a difference between the image of the characteristic region in the characteristic region image and the image of the characteristic region in the low image quality image. Then, the encoding section 530 encodes the characteristic region differential image and the low image quality image respectively.

The image quality converting section 510 also generates low image quality images resulting from lowering the resolution of the plurality of captured images, and the difference processing section 520 generates a characteristic region differential image representing a difference between the image of the characteristic region in the characteristic region image and the image resulting from enlarging the image of the characteristic region in the low image quality image. In addition, the difference processing section 520 generates a characteristic region differential image having a characteristic region and a non-characteristic region, where the characteristic region has a spatial frequency component corresponding to a difference between the characteristic region image and the enlarged image converted into a spatial frequency region, and an amount of data for the spatial frequency component is reduced in the non-characteristic region.

As explained above, the compression section 230 can perform hierarchical encoding by encoding the difference between the plurality of inter-layer images having different resolutions from each other. As can be understood, a part of the compression method adopted by the compression section 230 in the present configuration includes the compression method according to H.264/SVC. Note that to expand such a hierarchically compressed moving image, the image processing apparatus 170 can generate a captured image having an original resolution by decoding the moving image data of each layer and adding the decoded captured image in the layer for which the difference was taken in the region for which encoding was performed using the inter-layer difference.

Figure 6:
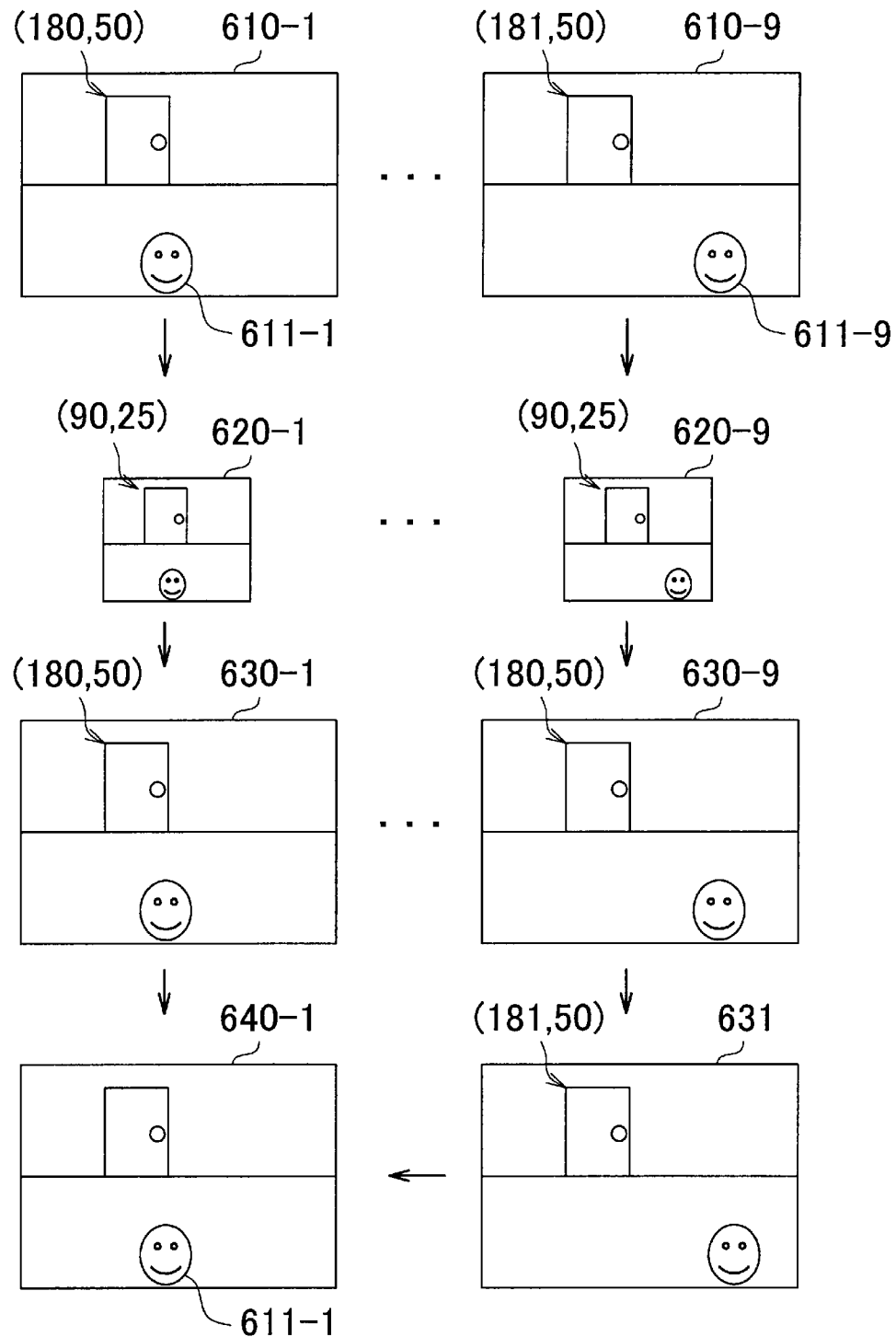
FIG. 6 shows an example of processing on a background region performed by the image processing system 10.

FIG. 6 shows an example of processing on a background region performed by the image processing system 10. A captured moving image obtained by the image capturing apparatus 100 includes a plurality of captured images 610-1 and 610-9 (hereinafter collectively referred to as "captured image 610"). Note that the characteristic region detecting section 203 has detected, from the captured image 610, head regions 611-1 and 611-9 (hereinafter collectively referred to as "head region 611") as an example of a characteristic region.

Note that even when the image capturing apparatus 100 is fixed to the wall or the ceiling, etc., if the wall or the ceiling slightly fluctuates, there is a chance that the captured image causes a minute blurring in the order of a half pixel or a pixel. In the example of the present drawing, the upper left end of the object representing a door corresponds to (180, 50) on the captured image 610-1, however in the captured image 610-9, the upper left end of the same object corresponds to (181, 50).

In such a case, the position difference calculating section 260 calculates a difference in position of the object between the captured image 610-1 and the captured image 610-9. For example, the position difference calculating section 260 calculates the difference in position of the object between the image of the region other than the characteristic region in the captured image 610-1 and the image of the region other than the characteristic region in the captured image 610-9. In the example of the present drawing, the position difference calculating section 260 calculates the difference in position of the object representing the door to be (1, 0).

When provided with the captured image 610, the image quality converting section 241 generates reduced images 620-1 and 620-9, by reducing the image of the region (the region other than the head region 611-1) other than the characteristic region in the captured image 610-1 and the image of the region (the region other than the head region 611-9) other than the characteristic region in the captured image 610-9, respectively. More specifically, the image quality converting section 241 generates the reduced images 620-1 and 620-9, by reducing the image of the region other than the characteristic region in the first captured image and the image of the region other than the characteristic region in the second captured image to be smaller than the image of the characteristic region (e.g., head region 611) respectively.

In this way, the image quality converting section 241 reduces the first captured image 610 and the second captured image 610 whose difference in position has been detected by the position difference calculating section 260, respectively, to generate reduced images 620-1 and 620-9. More specifically, the image quality converting section 241 thins the pixels of the captured images 610-1 and 610-9, to generate reduced images 620-1 and 620-9.

For example, the image quality converting section 241 provides thinning processing for thinning every other pixel in x-direction and y-direction, on the captured image 610. As a result, the upper left end of the object representing a door is located on (90, 25) in both of the reduced images 620-1 and 620-9. The output section 207 outputs the reduced images 620-1 and 620-9, in association with the difference in position (1, 0).

The image enlarging section 332 enlarges the reduced images 620-1 and 620-9 outputted from the output section 207, respectively, to generate enlarged images 630-1 and 630-9.

The combining section 330 generates a high image quality image 640-1 by overlapping, with the enlarged image 630-1, the image 631 obtained by displacing the position of the enlarged image 630-9 by the difference in position (1, 0), and combining thereto the image of the head region 611-1. In this way, the combining section 330 generates the high image quality image 640-1 by overlapping the enlarged images 630-9 and 630-1, by displacing by the difference in position. In this way, the image generating section 380 generates the high image quality image 640-1 by combining the reduced images 620-1 and 620-9, based on the difference in position outputted from the output section 207 in association with the reduced images 620-1 and 620-9. Note that the resolution of the image of the background region in the high image quality image 640-1 may be the same as the resolution of the image of the head region 611.

As explained in the example of the present drawing, when the image of the background region is displaced by a single pixel in x-direction in the original image, and the image quality converting section 241 generates the reduced images 620-1 and 620-9 by thinning out every other pixels, the combining section 330 can obtain the high image quality image 640-1 having the same resolution as the original image in the x-direction, by simply overlapping the enlarged images 630. However when the displacement is less than a pixel in the original image, or when more pixels are thinned out by the image quality converting section 241, the combining section 330 may have to perform simple interpolation of pixel values, a three-dimensional spline interpolation, weighting addition of the periphery pixels, or the like, to generate a high image quality image having the same resolution as the original image. Here, the resolution uses the number of pixels as an index, and is not necessarily the image resolution of the high quality image, i.e., how much details are shown in the image.

As described above, the image generating section 380 combines the reduced images 620-1 and 620-9 based on the difference in position, to generate a high image quality image having a higher resolution than the reduced images 620-1 and 620-9. More specifically, the image generating section 380 generates the high image quality image 640-1 by overlapping the reduced images 620-1 and 620-9 by displacing them in an amount corresponding to the difference in position.

The compression processing section 236 may perform intraframe compression on the reduced images 620-1 and 620-9 generated by the image quality converting section 241. In this case, the output section 207 may output the intraframe compressed reduced images 620-1 and 620-9, in association with the difference in position. Then, the expanding section 320 expands the intraframe compressed reduced images 620-1 and 620-9, both outputted from the output section 207.

The image generating section 380 may generate a high image quality image including more number of pixels than reduced images 620-1 and 620-9, by combining the expanded reduced images 620-1 and 620-9, both expanded by the expanding section 320. In this case, the position difference calculating section 260 calculates the difference in position, using the captured image 610 to be intraframe compressed later by the compression processing section 236. Note that when the high resolution processing explained with reference to the present drawing is performed, the intermediate image generating section 233 and the image quality converting section 510 do not generate an intermediate image, and supplies the image of the background region as it is to the image quality converting section 241d or to the image quality converting section 510.

According to the above-stated operation of the image processing system 10, a high image quality image 640-1 having high resolution can be obtained from the reduced images 620-1 and 620-9. As shown in the present drawing, the object of the door is located in the same coordinates in the reduced images 620-1 and 620-9, and the position difference information of the original image is lost. In this way, the reduction processing lowers the accuracy of the position difference information. However, in the image processing system 10, the position difference calculating section 260 calculates the difference in position in the original image, and outputs the difference in position in association with the reduced image 620, and so this position difference information can be utilized later to render the object in high resolution with high accuracy.

FIG. 7 shows an example of intermediate image generating processing performed by an intermediate image generating section 233. In the high resolution processing explained with reference to FIG. 6, the image quality converting section 241d in the image processing apparatus 120 is used to reduce the captured images 610-1 and 610-9 to generate the reduced images 620-1 and 620-9. Then, the image processing apparatus 170 renders into high resolution the background region by means of interpolation of pixel values and based on the reduced images 620-1 and 620-9 and the difference in position calculated by the position difference calculating section 260.

On the other hand, in the method explained with reference to the present drawing, the image processing apparatus 120 performs the substantial high resolution processing. Concretely, the intermediate image generating section 233 generates an intermediate image by performing interpolation processing of pixel values based on the difference in position calculated by the position difference calculating section 260. Then, the output section 207 transmits, to the image processing apparatus 170, the reduced image obtained by the reduction processing of the intermediate image performed by the image quality converting section 241*d*. The following details this processing.

In the present drawing, the pixel value waveform 750 shows an example of a pixel value waveform in x-direction based on the pixel values (shown by black points) in a part of the background region in the captured image 610-1. In addition, the pixel value waveform 760 shows an example of a pixel value waveform in x-direction based on the difference in position calculated by the position difference calculating section 260 and the pixel values in a part of the background region in the captured image 610-9. The intermediate image generating section 233 calculates the pixel values represented by white points in the pixel value waveform 760. Note that the pixel value of a white point may be the midpoint of the x-coordinates of black points.

In this way, the intermediate image generating section 233 estimates the pixel values among the pixel positions of the captured image 610-1, based at least on the difference in position calculated by the position difference calculating section 260 and the captured image 610-9, and generates an intermediate image based on the estimated pixel values. Specifically, the intermediate image generating section 233 estimates the pixel values among the pixel positions of the region other than the characteristic regions in the captured image 610-1, based at least on the difference in position and the image of the region other than the characteristic regions in the captured image 610-9, and generates an intermediate image based on the estimated pixel values.

The image quality converting section 241*d* reduces the captured image 610-1 and the intermediate image respectively, to generate a reduced image. Note that the image quality converting section 241*d* may generate a reduced image by reducing both of the image of the region other than the characteristic regions in the captured image 610-1 and the intermediate image, to be smaller than the image of the characteristic regions. The output section 207 outputs the reduced image generated by the captured image 610-1 and the intermediate image. Then, in the image processing apparatus 170, the image generating section 380 generates an image by combining these reduced images. Specifically, the image generating section 380 generates an image by overlapping these reduced images.

In the above explanation, the operations of the intermediate image generating section 233 and of the image quality converting section 241*d* are explained. However in the configuration of the compression section 230 explained above with reference to FIG. 5, the intermediate image generating section 503 may generate an intermediate image according to the processing similar to the processing performed by the intermediate image generating section 233, and the image quality converting section 510 may reduce the intermediate image according to the processing similar to the processing performed by the image quality converting section 241*d*. According to the processing explained above with reference to the present drawing, the substantial high resolution processing is performed by the image processing apparatus 120, and so the amount of operation performed by the image processing apparatus 170 can be reduced.

Figure 8:
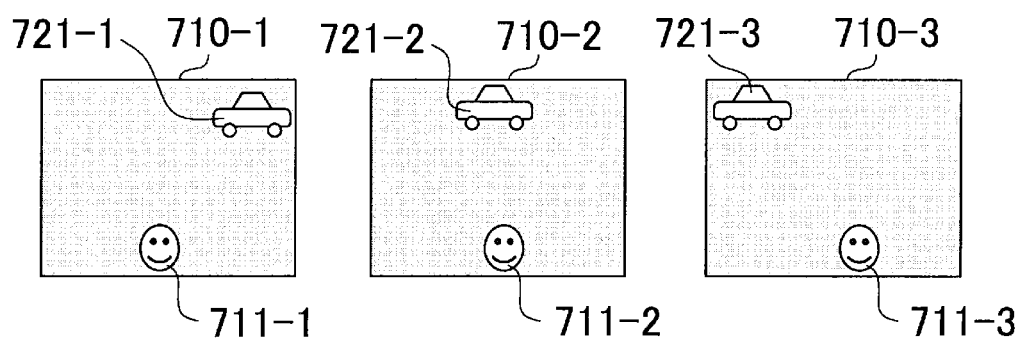
FIG. 8 shows an example of processing to select a characteristic region performed by a characteristic region selecting section 370.

FIG. 8 shows an example of processing to select a characteristic region performed by a characteristic region selecting section 370. The characteristic region detecting section 203 has detected, as a characteristic region, head regions 711-1 through 711-3 (hereinafter collectively referred to as "head region 711") from captured images 710-1 through 710-3 (hereinafter collectively referred to as "710"). In addition, the characteristic region detecting section 203 has detected, as a characteristic region, vehicle regions 721-1 through 721-3 (hereinafter collectively referred to as "vehicle region 721") from captured images 710-1 through 710-3.

The characteristic region selecting section 370 selects, as a region having high correlation, characteristic regions including an object moving in substantially the same speed, based on the position of the head region 711 and the position of the vehicle region 721. In the example of the present drawing, the characteristic region selecting section 370 can select the set of head regions 711-1 through 711-3 as a set of characteristic regions having high correlation, and the set of vehicle regions 721-1 through 721-2 as another set of characteristic regions having high correlation. In this way, the image processing system 10 can quickly identify characteristic regions having high correlation, from the positions of the characteristic regions detected by the image processing apparatus 120. Note that the characteristic region selecting section 370 may select such characteristic regions having high correlations based on the images of the characteristic regions, exclusively for the characteristic regions in the plurality of captured images on substantially the same position.

As explained above with reference to FIG. 3, the images of the characteristic regions selected by the characteristic region selecting section 370 are rendered in high resolution by the image generating section 380. Since the high resolution processing performed by the image generating section 380 is the same as the high resolution processing performed for the background region explained above with reference to FIG. 6, and so is not explained below.

Figure 9:
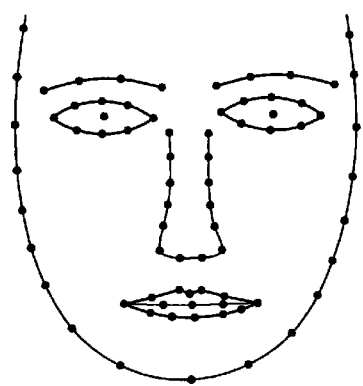
FIG. 9 shows an example of a characteristic point in a human face.

FIG. 9 shows an example of a characteristic point in a human face. As explained above with reference to FIG. 3, the model storage section 350 stores a model expressing an object using a character parameter. The following explains a method of utilizing an AAM method in generating the model of a face of a person that is an example of the object, as an example of a generating method of generating a model stored by the model storage section 350.

"n" characteristic points representing the facial form are set with respect to each of the plurality of facial images (hereinafter referred to as "sample image") representing a facial portion of a person as a sample as shown in FIG. 9. Note that the number of characteristic points is assumed to be smaller than the pixel number of the facial image. Each characteristic point may be determined in advance to show a portion of the face such that the first characteristic point represents the left end of the left eye, the eleventh characteristic point represents the center between the eye brows, and so on. In addition, each characteristic point may be set manually, or automatically by recognition processing.

Then, based on the characteristic points set in each sample image, the average form of the face is calculated. Specifically, the average of the positional coordinates for each characteristic point showing the same portion is obtained in each sample image. Then, the principal component analysis is performed based on the positional coordinates of the characteristic points representing the facial form in each sample image and its average form. As a result, a facial form S can be expressed as $S = S_0 + \Sigma p_i b_i$ (i=1−n).

Here, "S" represents a form vector represented by arranging the positional coordinates of each characteristic point of the facial form $(x_1, y_1, \ldots, x_n, y_n)$, "$S_0$" represents an average facial form vector represented by arranging the positional coordinates of each characteristic point in the average facial form, "$p_i$" represents an eigenvector showing the i-th principal component of the facial form obtained by the principal component analysis, and "$b_i$" represents the weighting factor for each eigenvector $p_i$.

Figure 10A:
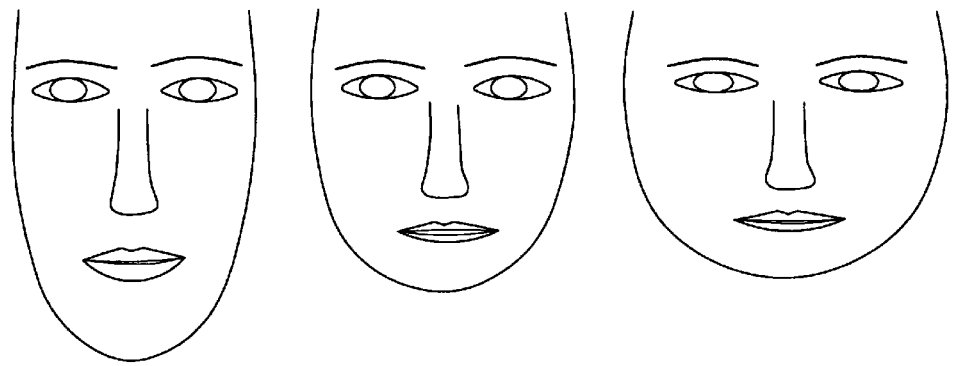
FIG. 10A and FIG. 10B schematically show an example of change in facial form when a weighting factor b is changed.
Figure 10B:
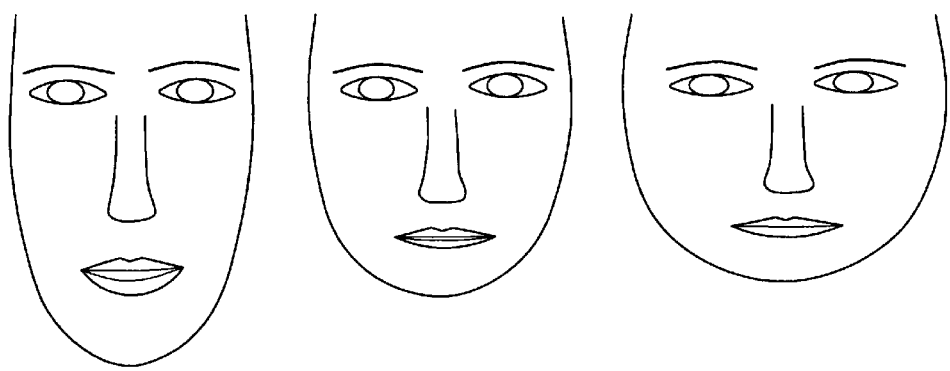

FIG. 10A and FIG. 10B schematically show an example of change in facial form when a weighting factor b is changed. The present drawings schematically show the change in facial form in changing the values of the weighting factors $b_1$ and $b_2$ with respect to the eigenvectors $p_1$, $p_2$ of the upper two principal components obtained by the principal component analysis. FIG. 10A shows change in facial form when the weighting factor $b_1$ is changed, and FIG. 10B shows change in facial form when the weighting factor $b_2$ is changed. In each case of FIG. 10A and FIG. 10B, the center of three facial forms for each principal component shows an average facial form.

In this case, the component contributing to the outline form of the face is extracted as the first principal component, as a result of the principal component analysis. By changing the weighting factor $b_1$, the facial form changes from a) the thin face shown in the left end to a) the round face shown in the right end. As the second principal component, the components contributing to the open/close state of the mouth and the length of the chin are extracted, and so by changing the weighting factor $b_2$, the facial form changes from b) the long chin with the mouth open in the left end to b) the short chin with the mouth closed in the right end. Note that each person may interpret differently as to which element of form a principal component contributes. The principal component analysis enables to extract a principal component expressing a larger difference in form in each used sample image, as a lower-order principal component.

FIG. 11 shows an example of an image obtained by converting a sample image into an average facial form. Each sample image is converted (warped) into an average facial form. Concretely, the amount of shift between each sample image and an average facial form is calculated for each characteristic point. Then using thus calculated amount of shift, the amount of shift of each sample image to an average facial form for each pixel is calculated, to warp each sample image to an average facial form for each pixel.

Then, the principal component analysis is conducted using, as a variable, the pixel value of the color component of R, G, B of each pixel of each sample image after conversion into an average facial form. As a result, the pixel value of the color component of R, G, B in the average facial form of an arbitrary facial image can be approximated using an expression $A = A_0 + \Sigma q_i \lambda_i$ (i=1–m).

Here, "A" represents the vector (r1, g1, b1, r2, g2, b2, ..., rm, gm, bm) represented by arranging each pixel value of R, G, B color components of each pixel in an average form. Note that "r," "g," and "b" represent the pixel value of R, G, B color components respectively, 1–m represent a suffix identifying each pixel, and "m" represents the total number of pixels in the average facial form. Note that the order of arrangement of the vector components is not limited as stated above.

In addition, $A_0$ represents an average vector represented by arranging the average of each pixel value of R, G, B color components of each pixel of each sample image in the average facial form, $q_i$ represents an eigenvector representing i-th principal component for the pixel value of R, G, B color components of the face obtained by the principal component analysis, and $\lambda_i$ represents a weighting factor for each eigenvector $q_i$.

FIG. 12A and FIG. 12B schematically show an example of change in pixel value when a weighting factor q is changed. The present drawings schematically show the change in pixel value of the face in changing the values of the weighting factors $\lambda_1$ and $\lambda_2$ with respect to the eigenvectors $q_1$, $q_2$ of the upper two principal components obtained by the principal component analysis. FIG. 12A shows change in pixel value when the weighting factor $\lambda_1$ is changed, and FIG. 12B shows change in pixel value when the weighting factor $\lambda_2$ is changed. In each case of FIG. 12A and FIG. 12B, the center of three facial forms for each principal component shows an average pixel value.

In the present example, the component contributing whether there is beards is extracted as the first principal component, as a result of the principal component analysis. By changing the weighting factor $\lambda_1$, the face changes from a) the beardless face shown in the left end to a) the face with thick beards shown in the right end. As the second principal component, the component contributing to the thickness of the eyebrow is extracted, and so by changing the weighting factor $\lambda_2$, the face changes from b) the face with scarce eyebrow at the left end to b) the face with thick eyebrow at the right end.

The processing explained with reference to FIG. 10 through FIGS. 12A-12B enables to generate the facial model. The model represents a face by a plurality of eigenvectors $p_i$ representing the facial form and an eigenvector $q_i$ representing the pixel value of the face in the average facial form. The summation value of each eigenvector of the model is substantially smaller than the number of pixels forming the facial image. Note that in the above-stated example, different weighting factors $b_i$, $\lambda_i$ are used for the facial form and the pixel values of R, G, B color components to express different facial images, since there is correlation between variations of the facial form and the color component pixel values, it is also possible to perform principal component analysis on the character parameter including both of the characteristic point and the pixel value.

The following shows an example of processing performed by the image generating section 380 to render into high resolution the image of the characteristic region using the model stored in the model storage section 350. The image generating section 380 normalizes the input facial image included in the characteristic region, to calculate the pixel value of the R, G, B color component in the average facial form. Note that the input facial image is not always taken from the front, or may be taken under an illumination condition different from the illumination condition under which the sample image was taken. Therefore, not limited to processing to align the characteristic points of the front face as stated above, the normalization in this specification also includes converting into the facial image captured under the same image capturing environment as that of the sample image, such as conversion processing for converting the direction of the input facial image as taken from the slanting direction into the facial image as taken from the front, and shadow removal processing to remove the effect of the shadow due to illumination.

The image generating section 380 calculates the weighting factor $\lambda_i$ by projecting the pixel value difference from the average face onto the principal component vector $q_i$. Specifically, the image generating section 380 can calculate the weighting factor $\lambda_i$ by the inner product with the principal component vector $q_i$. Then, the image generating section 380 uses the obtained weighting factor $\lambda_i$, the pixel value $A_0$ of the average face, and the principal component vector $q_i$, to calculate the pixel value "A" in the average facial form.

In addition, the image generating section 380 calculates the characteristic point S of the face using the similar processing as the above-described calculation of the pixel value A. Specifically, the image generating section 380 calculates the weighting factor $b_i$ by projecting the difference in position of the characteristic points from the average face on the principal component vector $p_i$. Then, the image generating section 380 calculates the characteristic point "A" using the obtained weighting factor $b_i$, the characteristic point $S_0$ of the average face, and the principal component vector $p_i$. Then, the image generating section 380 performs inverse conversion of the above-described normalization processing excluding the processing to align the characteristic points, onto the image represented by the pixel value "A" and the characteristic point "A."

According to the above-described processing, the image generating section 380 generates a high image quality image having a higher image quality than the image quality of the captured image, based on the image of the characteristic region in the captured image outputted from the output section 207. Specifically, the image generating section 380 may generate an image of a higher resolution, a sharper image, an image having less noise, an image having more number of gradations, or an image having a larger number of colors, than the captured image outputted from the output section 207.

FIG. 13 shows, in table format, an exemplary model stored in a model storage section 350. The model storage section 350 stores a model for each combination of expression and direction. Exemplary expressions include faces in each state of delight, anger, sorrow, and pleasure, and a sober face, and exemplary directions include front, upper, lower, right, left, and back. The image generating section 380 can identify the expression of the face and the direction of the face, based on the facial image included in the characteristic region, and perform the above-explained reconstruction processing using the model stored in the model storage section 350 in association with the identified combination of expression and direction.

Note that the image generating section 380 may identify the expression from the form of the mouth and/or the eyes, and may identify the facial direction based on such as the positional relation of the eyes, the mouth, the nose, and the ears. Note that the image processing apparatus 120 may be used to identify the facial expression and the facial direction, and the output section 207 may be used to output the facial expression and the facial direction in association with the captured image.

Moreover, the model storage section 350 may store the model in association with the illumination condition, as well as in association with the facial expression and the facial direction. For example, the model storage section 350 may store the model in association with the strength and the direction of the illumination. The image generating section 380 may identify the illumination condition for the face based on the facial image included in the characteristic region. For example, the image generating section 380 may identify the strength and direction of the illumination based on the position and size of the shadow, and perform the above-explained reconstruction processing using the model stored in the model storage section 350 in association with the identified strength and direction of the illumination.

The above-described example has stated generation of a model for expressing the entire face and reconstruction using the model. However not limited to the model for the entire face, the image processing system 10 may also use a model for each portion of a face. The image processing system 10 may also use a model of a face different for each sex and/or race (or each portion of these faces). Furthermore, not limited to a human model as stated above, the image processing system 10 may store the model for each type of object under monitoring (e.g., vehicle and ship) by the image processing system 10. The image generating section 380 may perform reconstruction by selecting a model according to the type of object included in the characteristic region. The types of object may be detected in the image processing apparatus 120 to be transmitted to the image processing apparatus 170 in association with the captured image.

As explained above, the model storage section 350 may store models of different types of object in association with the types. The characteristic region information obtaining section 360 obtains information indicating the type of object included in the characteristic region in the inputted image. The image generating section 380 converts, into a high image quality image, the image of the object included in the characteristic region in the captured image, by adapting it to the model stored in the model storage section 350 in association with the type of the object included in the characteristic region obtained by the characteristic region information obtaining section 360.

As explained above, the image processing system 10 performs super resolution processing on the characteristic regions using a model, while not performing the super resolution processing on the background region. Therefore, the amount of operation required by the super resolution processing can be substantially reduced. In addition, regions having less importance such as the background region will not be rendered in high image quality, which helps reduce the amount of image data. In addition, according to the image processing system 10, the information identifying the characteristic regions is transmitted to the image processing apparatus 170, which prevents performance of super resolution mistakenly onto the background region only including a low image quality image.

As explained above, the model storage section 350 stores learning data for each portion (e.g., eyes, nose, and mouth) of a face which is an example of the information identifying a type of object. Here, the learning data may include, other than the models described above, a low frequency component and a high frequency component of the image of the object respectively extracted from a multiple sample images of the object. In this way, the model storage section 350 functions as an object image information storage section that stores a high frequency component of an image of an object, in association with its object type. Here, for each type of the plurality of objects, the low frequency component of the image of the object can be clustered into a plurality of clusters, by means of K-means or the like. In addition, a representative low frequency component (e.g., barycenter value) can be determined for each cluster.

The image generating section 380 extracts the low frequency component from the image of the object included in the captured image. The image generating section 380 identifies the cluster whose value matching the extracted low frequency component is determined as the representative low frequency component. The image generating section 380 identifies the cluster of the high frequency component associated with the low frequency component included in the identified cluster. In this way, the image generating section 380 can identify the cluster of the high frequency component correlated to the low frequency component extracted from the object included in the captured image. The image generating section 380 can convert the image of the object into higher image quality, using a high frequency component representative of the identified cluster of high frequency component. For example, the image generating section 380 may add, to the image of the object, the high frequency component selected for each object with a weight corresponding to the distance up to the processing target position on the face from the center of each object. Here, the representative high frequency component may be generated by closed-loop learning. In this way, the image generating section 380 can sometimes render the image of the object into high image quality with higher accuracy, since it selects desirable learning data from among the learning data generated by performing learning according to each object.

In this way, the image processing apparatus 170 can reconstruct the image of a characteristic region using a principal component analysis (PCA). Note that examples of the image reconstruction method by means of the image processing apparatus 170 and the learning method thereof include, other than the learning and image reconstruction by means of principal component analysis (PCA), locality preserving projection (LPP), linear discriminant analysis (LDA), independent component analysis (ICA), multidimensional scaling (MDS), support vector machine (SVM) (support vector regression), neutral network, Hidden Markov Model (HMM), Bayes estimator, Maximum a posteriori, Iterative Back Projection Method, Wavelet Conversion, locally linear embedding (LLE), Markov random field (MRF), and so on.

With reference to FIG. 6 to FIG. 8, the high image quality processing for generating a high image quality image based on the difference in position of the object calculated by the position difference calculating section 260 has been detailed above. Also with reference to FIG. 9 to FIG. 13, the high image quality processing for generating a high image quality image using a model stored in the model storage section 350 has been detailed above. The image generating section 380 may also generate a high image quality image by performing both of the high image quality processing based on the difference in position of the object and the high image quality processing using a model.

As explained above, assume a case in which the image obtaining section 301 has obtained an input moving image including a plurality of moving image constituting images and the characteristic region information obtaining section 360 has obtained information indicating the position of each characteristic region in each of the plurality of moving image constituting images. Under this assumption, also assume that the characteristic region selecting section 370 has selected, from the characteristic regions in each of a plurality of moving image constituting images, a first characteristic region and a second characteristic region having correlation higher than a predetermined value.

The image generating section 380 converts the image of the object included in the first characteristic region and the image of the object included in the second characteristic region respectively into the first high image quality image and the second high image quality image, by adapting them to the model stored in the model storage section 350 respectively. The first and second high image quality images can be obtained by performing the high image quality processing using a model, having been detailed above with reference to FIG. 9 through FIG. 14.

The image generating section 380 then performs high resolution processing by performing high image quality processing based on the difference in position of an object, having been detailed above with reference to the first and second high image quality images FIG. 6 through FIG. 8. That is, the image generating section 380 uses the first high image quality image, the second high image quality image, and the difference in position between the first and second characteristic regions, to generate a high image quality image having a higher resolution than the image of the object included in the first characteristic region and the image of the object included in the second characteristic region. Specifically, the image generating section 380 generates a high image quality image by combining the first and second high image quality images based on the difference in position. More specifically, the image generating section 380 generates a high image quality image by overlapping the first and second high image quality images by displacing them by the difference in position.

The high image quality image obtained by the high image quality processing based on the difference in position of an object may be further subjected to a high image quality processing using a model. That is, as detailed above with reference to FIG. 6 through FIG. 8, the image generating section 380 generates a high image quality image having a higher resolution than the image of the first characteristic region and the image of the second characteristic region, using the image of the first characteristic region, the image of the second characteristic region, and the positional difference between the first characteristic region and the second characteristic region. Then, the image of the object included in the characteristic region in the high image quality image is converted into higher image quality than the high image quality image, by adapting the image of the object included in the characteristic region in the high image quality image to the model stored in the model storage section 350.

Figure 14:
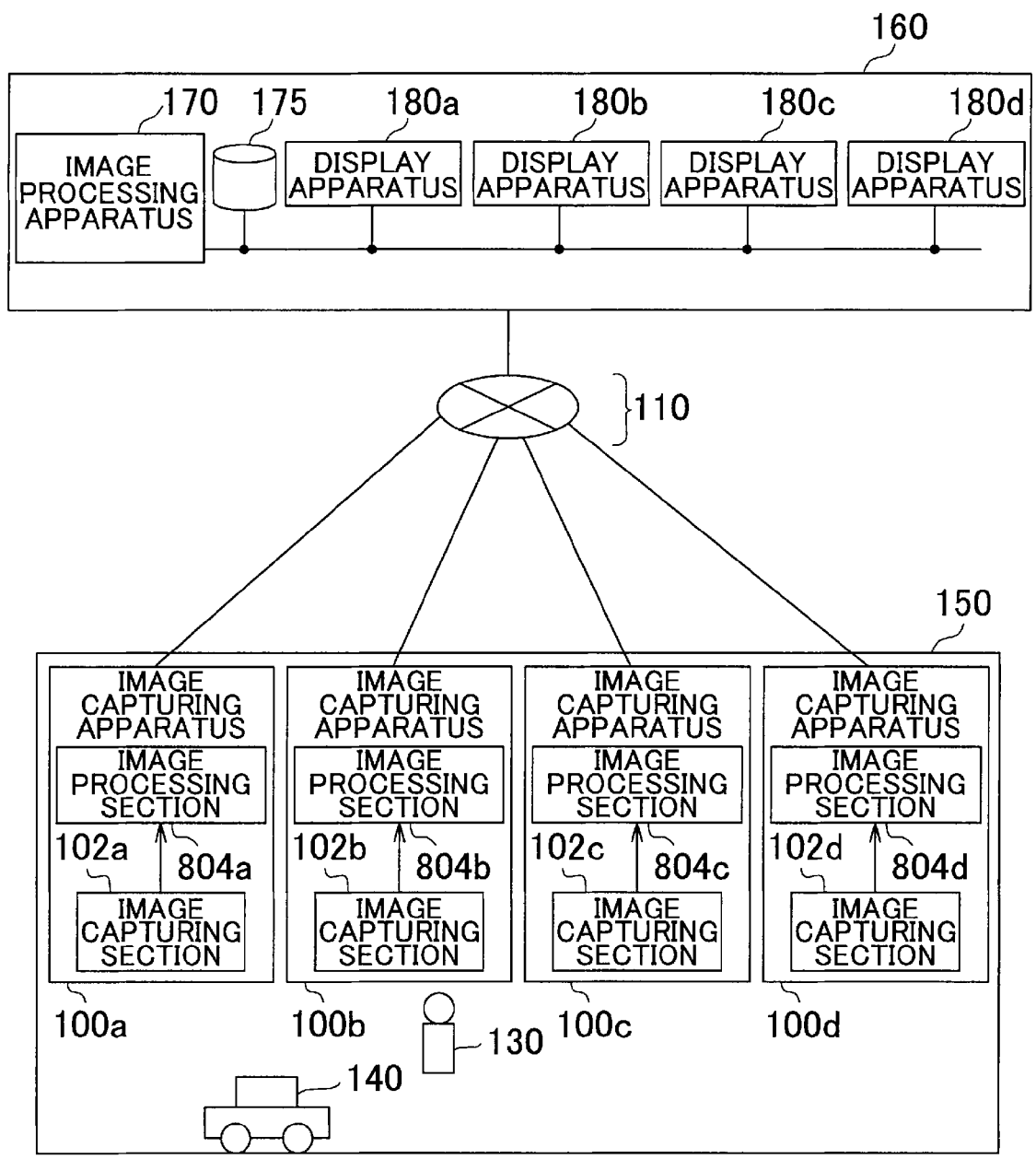
FIG. 14 shows an example of an image processing system 20 according to another embodiment.

FIG. 14 shows an example of an image processing system 20 according to another embodiment. The configuration of the image processing system 20 in the present embodiment is the same as the configuration of the image processing system 10 of FIG. 1, except that the image capturing apparatuses 100*a-d* respectively include image processing sections 804*a-d* (hereinafter collectively referred to as "image processing section 804").

The image processing section 804 includes all the constituting element of the image processing apparatus 120 except for the image obtaining section 250. The function and operation of each constituting element of the image processing section 804 may be substantially the same as the function and operation of each constituting element of the image processing apparatus 120, except that each constituting element of the image processing section 804 processes the captured moving image captured by the image capturing section 102 instead of processing the captured moving image obtained by expanding processing performed by the compressed moving image expanding section 202. The image processing system 20 having the stated configuration can also obtain substantially the same effect as the effect obtained by the image processing system 10 explained above with reference to FIG. 1 through FIG. 13.

Note that the image processing section 804 may obtain, from the image capturing section 102, a captured moving image including a plurality of captured images represented in RAW format, and compress the plurality of captured images represented in RAW format in the obtained captured moving image, as they are in the RAW format. Note that the image processing section 804 may detect one or more characteristic regions from a plurality of captured images represented in RAW format. In addition, the image processing section 804 may compress a captured moving image including a plurality of compressed captured images represented in RAW format. The image processing section 804 can perform compression using a compression method explained above as the operation of the image processing apparatus 120 with reference to FIG. 1 through FIG. 13. The image processing apparatus 170 can obtain the plurality of captured images represented in RAW format, by expanding the moving image obtained from the image processing section 804. The image processing apparatus 170 enlarges, for each region, the plurality of captured images represented in RAW format obtained by expansion, and performs synchronization processing for each region. During this operation, the image processing apparatus 170 may perform higher definition synchronization processing on the characteristic regions than in the region other than the characteristic region.

Then, the image processing apparatus 170 may perform such super resolution processing as explained above with reference to FIG. 1 through FIG. 13, onto the image of the characteristic region in the captured image obtained by the synchronization processing. In the explanation of FIG. 1 through FIG. 13, the image processing apparatus 170 has calculated the weighting factor in the super resolution processing. In this case, the image of the object included in the characteristic region can also be represented using the principal component vector and the weighting factor. However, the amount of data of these weighting factor and principal component vector is substantially smaller than the amount of the pixel data included in the image of the object itself. In view of this, the image processing section 804 may calculate the above-explained weighting factor from the image of the object included in the characteristic region, in the compression processing for compressing the images of the characteristic regions included in the plurality of captured images obtained from the image capturing section 102. That is, the image processing section 804 may compress the image of the object included in the characteristic region by expressing it by the principal component vector and the weighting factor. Then, the image processing section 804 may transmit the principal component vector and the weighting factor to the image processing apparatus 170. In the image processing apparatus 170, the image of the object included in the characteristic region can be reconstructed using the weighting factor and the principal component vector obtained from the image processing section 804 as explained above.

In this way, the image processing section 804 may calculate the value of the character parameter in the model representing the object included in the image of the characteristic region, by adapting the image of the object included in the image of the characteristic region in the captured image to the model representing the object by the character parameter. Then, the image processing section 804 may output the calculated value of the character parameter and the image of the region other than the characteristic region. Then, the image processing apparatus 170 may generate the image of the object by adapting the value of the character parameter obtained from the image processing section 804 to the model, and generate a single captured image using the generated image of the object and the image of the region other than the characteristic region.

Figure 15:
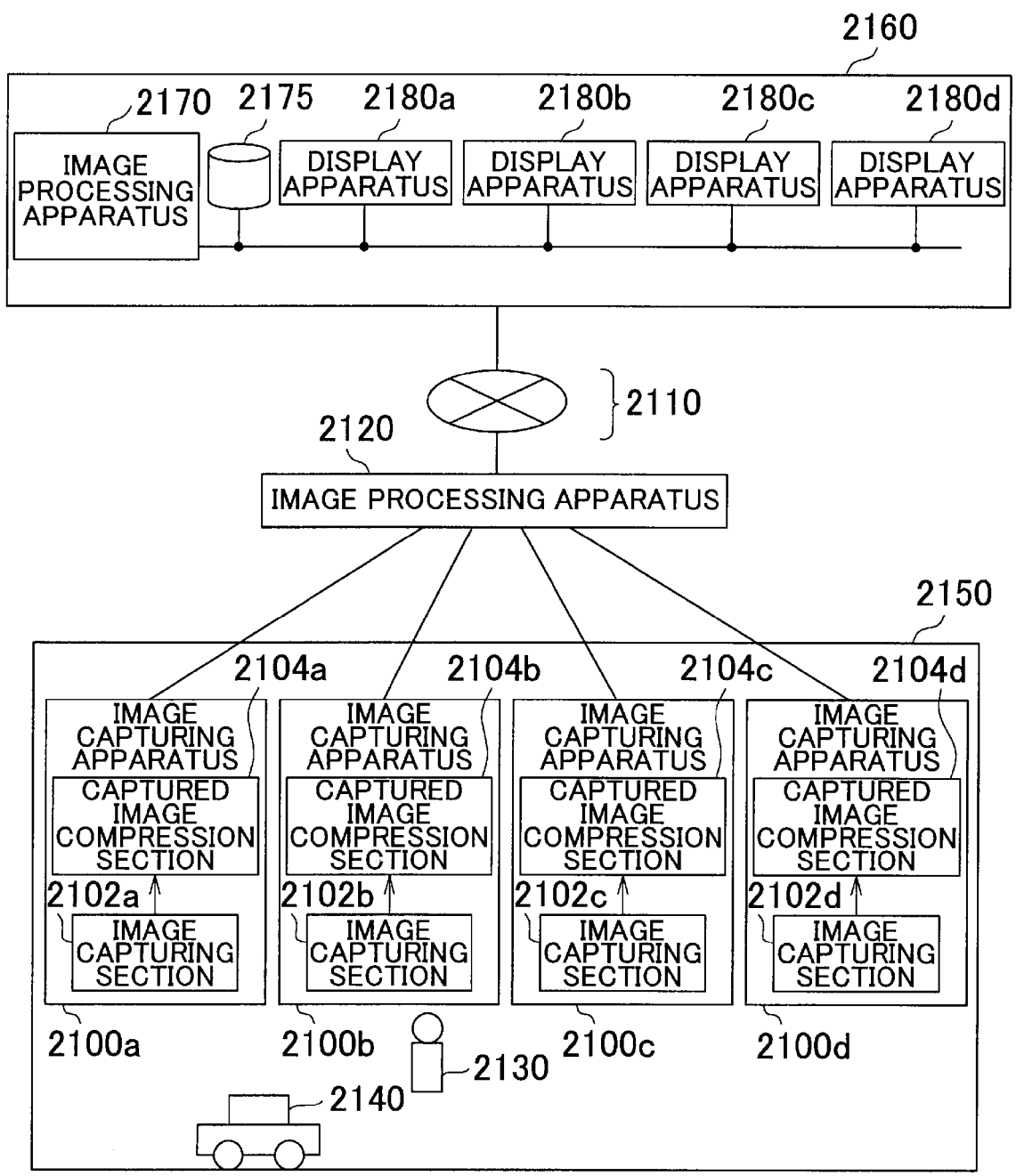
FIG. 15 shows an example of an image processing system 2010 according to an embodiment.

FIG. 15 shows an example of an image processing system 2010 according to an embodiment. The image processing system 2010 can function as a monitoring system as described below.

The image processing system 2010 includes a plurality of image capturing apparatuses 2100a-d (hereinafter collectively referred to as "image capturing apparatus 2100") for capturing an image of a monitored space 2150, an image processing apparatus 2120 for processing the images captured by the image capturing apparatus 2100, a communication network 2110, an image processing apparatus 2170, an image DB 2175, and a plurality of display apparatuses 2180a-d (hereinafter collectively referred to as "display apparatus 2180"). The image processing apparatus 2170 and the display apparatus 2180 are provided in a space 2160 different from the monitored space 2150.

The image capturing apparatus 2100a includes an image capturing section 2102a and a captured image compression section 2104a. The image capturing section 2102a captures a plurality of images by successively capturing the monitored space 2150. Note that the images captured by the image capturing section 2102a may be images in RAW format. The captured image compression section 2104a generates captured moving image data by synchronizing the captured images in RAW format captured by the image capturing section 2102a, and compressing a captured moving image including the plurality of captured images obtained by the synchronization, using MPEG encoding or the like. In this way, the image capturing apparatus 2100a generates captured moving image data by encoding the captured moving image obtained by capturing the image of the monitored space 2150. The image capturing apparatus 2100a outputs the captured moving image data to the image processing apparatus 2120.

Since the image capturing apparatuses 2100b, 2100c, and 2100d respectively have the same configuration as that of the image capturing apparatus 2100a, the explanation of each constituting element of the image capturing apparatuses 2100b, 2100c, and 2100d is not provided in the following. The image processing apparatus 2120 obtains, from each image capturing apparatus 2100, the captured moving image data generated by each image capturing apparatus 2100.

Then, the image processing apparatus 2120 obtains a captured moving image by decoding the captured moving image data obtained from the image capturing apparatus 2100. The image processing apparatus 2120 detects, from each of a plurality of captured images included in the obtained captured moving image, a plurality of characteristic regions having different characteristic types, such as a region including a person 2130, a region including a moving body 2140 such as a vehicle, and so on. The image processing apparatus 2120 may then compress the images of the characteristic regions at degrees corresponding to the characteristic types, and compress the image other than the characteristic region, at a degree higher than the compression degrees used in compressing the images of the characteristic regions.

Note that the image processing apparatus 2120 stores therein a mathematical model expressing an object using a character parameter. The image processing apparatus 2120 adapts the image of an object included in the characteristic region to the mathematical model, to calculate the value of the character parameter expressing the image of the object.

The image processing apparatus 2120 generates characteristic region information including information identifying a characteristic region detected from a captured image. Then, the image processing apparatus 2120 transmits the value of the character parameter and the characteristic region information attached to the compressed moving image data, to the image processing apparatus 2170 via the communication network 2110.

The image processing apparatus 2170 receives, from the image processing apparatus 2120, the compressed moving image data to which the value of the character parameter and the characteristic region information are attached. The image processing apparatus 2170 expands the received compressed moving image data using the attached characteristic region information. During this process, the image processing apparatus 2170 generates the image of the object in the characteristic region by changing the model with the value of the character parameter using the expanded image of the characteristic region. The moving image for display generated in this way is supplied to the display apparatus 2180. The display apparatus 2180 displays the moving image for display supplied from the image processing apparatus 2170.

In addition, the image processing apparatus 2170 may record, in the image DB 2175, the compressed moving image data and the character parameter, in association with the characteristic region information attached to the compressed moving image data. The image processing apparatus 2170, upon reception of the request of the display apparatus 2180, may read the compressed moving image data, the characteristic region information, and the value of the character parameter from the image DB 2175, and generate the moving image for display in the above-stated manner and supply it to the display apparatus 2180.

Note that the characteristic region information may be text data including the position, the size, and the number of characteristic regions, as well as identification information identifying the captured image from which the characteristic regions are detected. The characteristic region information may also be the above text data provided with processing such as compression and encryption. The image processing apparatus 2170 identifies a captured image satisfying various search conditions, based on the position, the size, the number of characteristic regions included in the characteristic region information. The image processing apparatus 2170 may decode the identified captured image, and provide the decoded image to the display apparatus 2180.

In this way, the image processing system 2010 records each characteristic region in association with a moving image, and so can quickly search the moving image for a group of captured images matching a predetermined condition, to perform random access. In addition, the image processing system 2010 can decode only a group of captured images matching a predetermined condition, enabling to display a partial moving image matching a predetermined condition quickly in response to a playback request.

Figure 16:
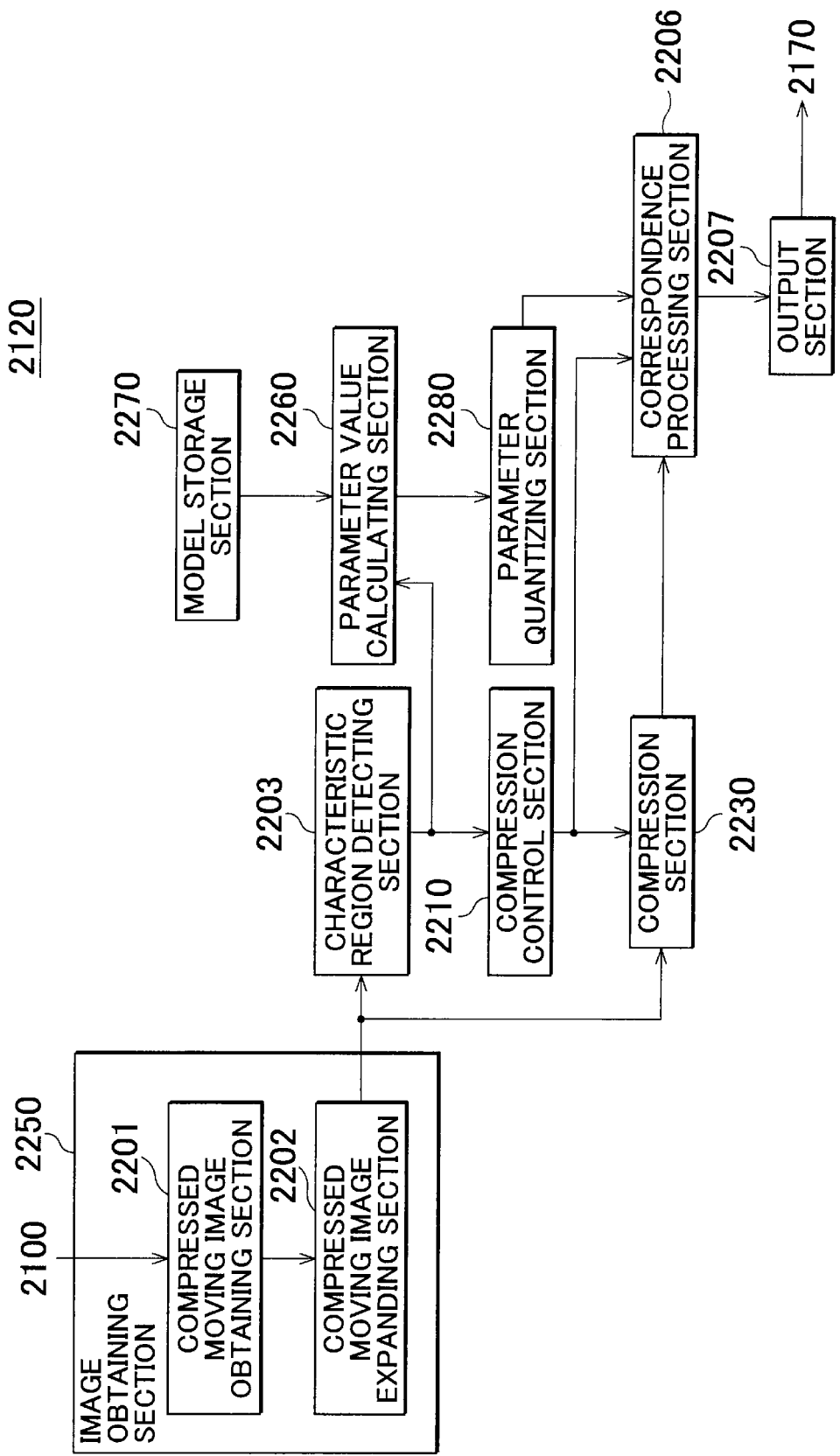
FIG. 16 shows an example of a block configuration of the image processing apparatus 2120.

FIG. 16 shows an example of a block configuration of an image processing apparatus 2120. The image processing apparatus 2120 includes an image obtaining section 2250, a characteristic region detecting section 2203, a model storage section 2270, a parameter value calculating section 2260, a parameter quantizing section 2280, a compression control section 2210, a compression section 2230, a correspondence processing section 2206, and an output section 2207. The image obtaining section 2250 includes a compressed moving image obtaining section 2201 and a compressed moving image expanding section 2202.

The compressed moving image obtaining section 2201 obtains the compressed moving image. Specifically, the compressed moving image obtaining section 2201 obtains the encoded captured moving image data generated by the image capturing apparatus 2100. The compressed moving image expanding section 2202 expands the captured moving image data obtained by the compressed moving image obtaining section 2201, and generates a plurality of captured images included in the captured moving image. Specifically, the compressed moving image expanding section 2202 decodes the encoded captured moving image data obtained by the compressed moving image obtaining section 2201, and generates the plurality of captured images included in the captured moving image. A captured image included in the captured moving image may be a frame image or a field image. Note that a captured image in the present embodiment may be an example of a moving image constituting image of the present invention. In this way, the image obtaining section 2250 obtains the plurality of moving images captured by each of the plurality of image capturing apparatuses 2100.

The plurality of captured images obtained by the compressed moving image expanding section 2202 are supplied to the characteristic region detecting section 2203 and to the compression section 2230. The characteristic region detecting section 2203 detects a characteristic region from a moving image including a plurality of captured images. Specifically, the characteristic region detecting section 2203 detects a characteristic region from each of the plurality of captured images. Note that the above-described captured moving image may be an example of a moving image in the following explanation.

For example, the characteristic region detecting section 2203 detects, as a characteristic region, an image region of a moving image, within which the image changes. Specifically, the characteristic region detecting section 2203 may detect, as a characteristic region, an image region including a moving object. Note that the characteristic region detecting section 2203 may detect a plurality of characteristic regions having different characteristic types from each other, from each of the plurality of captured images. Note that the type of a characteristic may be defined using a type of an object (e.g., a person, a moving body) as an index. The type of the object may be determined based on the degree of matching of the form of the objects or the color of the objects. In this way, the characteristic region detecting section 2203 may detect, from a plurality of captured images, a plurality of characteristic regions respectively including different types of objects.

For example, the characteristic region detecting section 2203 may extract an object that matches a predetermined form pattern at a degree of matching higher than a predetermined degree of matching, from each of the plurality of captured images, and detect the regions in the captured images that include the extracted object, as characteristic regions sharing the same characteristic type. A plurality of form patterns may be determined for a plurality of characteristic types respectively. An exemplary form pattern is a form pattern of a face of a person. Note that a plurality of face patterns may be provided for a plurality of people respectively. Accordingly, the characteristic region detecting section 2203 may detect different regions including different people from each other, as different characteristic regions. Note that the characteristic region detecting section 2203 may also detect, as characteristic regions, regions including a part of a person such as head of a person, hand of a person, or at least a part of a living body other than a human being, not limited to a face of a person mentioned above. Note that a living body includes certain tissue existing inside the living body, such as tumor tissue or blood vessels in the living body. The characteristic region detecting section 2203 may also detect, as characteristic regions, regions including money, a card such as a cache card, a vehicle, or a number plate of a vehicle, other than a living body.

In addition to the pattern matching using a template matching, the characteristic region detecting section 2203 may also perform characteristic region detection based on the learning result such as by machine learning (e.g. AdaBoost) described in Japanese Patent Application Publication No. 2007-188419. For example, the characteristic region detecting section 2203 uses the image feature value extracted from the image of a predetermined subject and the image feature value extracted from the image of a subject other than the predetermined subject, to learn about the characteristic in the image feature value extracted from the image of the predetermined subject. Then, the characteristic region detecting section 2203 may detect, as a characteristic region, a region from which the image feature value corresponding to the characteristic matching the learned characteristic is extracted. Accordingly, the characteristic region detecting section 2203 can detect, as a characteristic region, a region including a predetermined subject.

In this way, the characteristic region detecting section 2203 detects a plurality of characteristic regions from a plurality of captured images included in each of a plurality of moving images. The characteristic region detecting section 2203 supplies information indicating a detected characteristic region to the compression control section 2210. Information indicating a characteristic region includes coordinate information of a characteristic region indicating a position of a characteristic region, type information indicating a type of a characteristic region, and information identifying a captured moving image from which a characteristic region is detected. In this way, the characteristic region detecting section 2203 detects a characteristic region in a moving image.

The compression control section 2210 controls compression of a moving image performed by the compression section 2230 for each characteristic region, based on the information indicating a characteristic region obtained from the characteristic region detecting section 2203. Note that the compression section 2230 may compress the captured image by changing the degree of compression between the characteristic regions in the captured image and the region other than the characteristic regions in the captured image. For example, the compression section 2230 compresses the captured image by lowering the resolution of the region other than the characteristic regions in the captured image included in the moving image. In this way, the compression section 2230 compresses the image of the region other than the characteristic regions, by reducing the image quality of the image of the region other than the characteristic regions. In addition, the compression section 2230 compresses each of the image regions in a captured image depending on its degree of importance. Note that the concrete compression operation performed inside the compression section 2230 is detailed later.

Note that the model storage section 2270 stores a model expressing an object by a character parameter. For example, the model storage section 2270 may store a model expressing an object by a statistical character parameter. More specifically, the model storage section 2270 may store a model expressing an object by a principal component based on a principal component analysis. Note that the model storage section 2270 may store a model expressing the form of an object by a principal component based on a principal component analysis. In addition, the model storage section 2270 may store a model expressing the color of an object by a principal component based on a principal component analysis.

The parameter value calculating section 2260 adapts an image of the object included in the image of the characteristic region in the captured image to a model stored in the model storage section 2270, thereby calculating the value of the character parameter in the model expressing the object included in the image of the characteristic region. Specifically, the parameter value calculating section 2260 calculates the weight of the principal component of the model. When the character parameter is a principal component vector obtained by the principal component analysis, an example of the value of the character parameter is a weighting factor for the principal component vector.

The parameter quantizing section 2280 selects a character parameter whose value is to be outputted from the output section 2207. Specifically, the parameter quantizing section 2280 determines to which level of the principal components extracted by the principal component analysis the weighting factor should be outputted. For example, the parameter quantizing section 2280 determines that the weighting factor for the principal component should be outputted to the level predetermined according to the characteristic type of the characteristic region. The weighting factor to the level of the principal component determined by the parameter quantizing section 2280 is supplied to the correspondence processing section 2206.

The correspondence processing section 2206 associates information identifying the characteristic region detected from the captured image and the weighting factor, with the captured image. Specifically, the correspondence processing section 2206 associates the information identifying the characteristic region detected from the captured image and the weighting factor, with a compressed moving image including the captured image as a moving image constituting image. The output section 2207 outputs, to the image processing apparatus 2170, the compressed moving image to which the information identifying the characteristic region and the weighting factor are associated by the correspondence processing section 2206.

In this way, the output section 2207 outputs the value of the character parameter calculated by the parameter value calculating section 2260 and image of the region other than characteristic regions. The output section 2207 may output the value of the character parameter selected by the parameter quantizing section 2280 and the image of the region other than the characteristic regions whose image quality has been lowered by the compression section 2230.

Note that the compressed moving image outputted from the output section 2207 does not have to include pixel information for the characteristic region. In this way, the output section 2207 outputs the weight of the principal component calculated by the parameter value calculating section 2260 and the image of the region other than the characteristic region. The output section 2207 may output the value of the character parameter calculated by the parameter value calculating section 2260 and the image of the region other than the characteristic region whose image quality has been lowered by the compression section 2230.

As explained above, the image processing apparatus 2120 can sufficiently reduce the amount of data by expressing the image of an object in the characteristic region by the model information as well as retaining information operable to reconstruct the image of the object in the future. Moreover, the amount of data can be substantially reduced by lowering the image quality of the background region having a low degree of importance compared to the characteristic regions.

Note that the model storage section 2270 may store models of different types of objects in association with the types. The parameter value calculating section 2260 may calculate the value of the character parameter by adapting the image of the object included in the image of the characteristic region in the captured image, to the model stored by the model storage section 2270 in association with the type of the object included in the characteristic region. In this case, the output section 2207 desirably outputs the value of the character parameter calculated by the parameter value calculating section 2260, the type of the object included in the characteristic region, and the image of the region other than the characteristic region whose image quality has been lowered by the compression section 2230. This allows the image processing apparatus 2170 to select and reconstruct the model of the adequate type.

The model storage section 2270 may also store models of an object in different directions, in association with the directions. The parameter value calculating section 2260 may calculate the value of the character parameter by adapting the image of the object included in the image of the characteristic region in the captured image, to the model stored by the model storage section 2270 in association with the captured direction of the object included in the characteristic region. In this case, the output section 2207 desirably outputs the value of the character parameter calculated by the parameter value calculating section 2260, the captured direction of the object included in the characteristic region, and the image of the region other than the characteristic region whose image quality has been lowered by the compression section 2230.

The model storage section 2270 may also store models of an object illuminated in different illumination conditions, in association with the illumination conditions. The parameter value calculating section 2260 may calculate the value of the character parameter by adapting the image of the object included in the image of the characteristic region in the captured image, to the model stored by the model storage section 2270 in association with the illumination condition used to illuminate the object included in the characteristic region. In this case, the output section 2207 desirably outputs the value of the character parameter calculated by the parameter value calculating section 2260, the illumination condition used to illuminate the object included in the characteristic region, and the image of the region other than the characteristic region whose image quality has been lowered by the compression section 2230.

In this way, the model storage section 2270 stores a plurality of models in association with the type of the object, the direction of the object, and the illumination condition. Therefore, the image of the object of the characteristic region can be expressed using a more adequate model, thereby reducing the amount of data while maintaining the image quality of the characteristic region.

Figure 17:
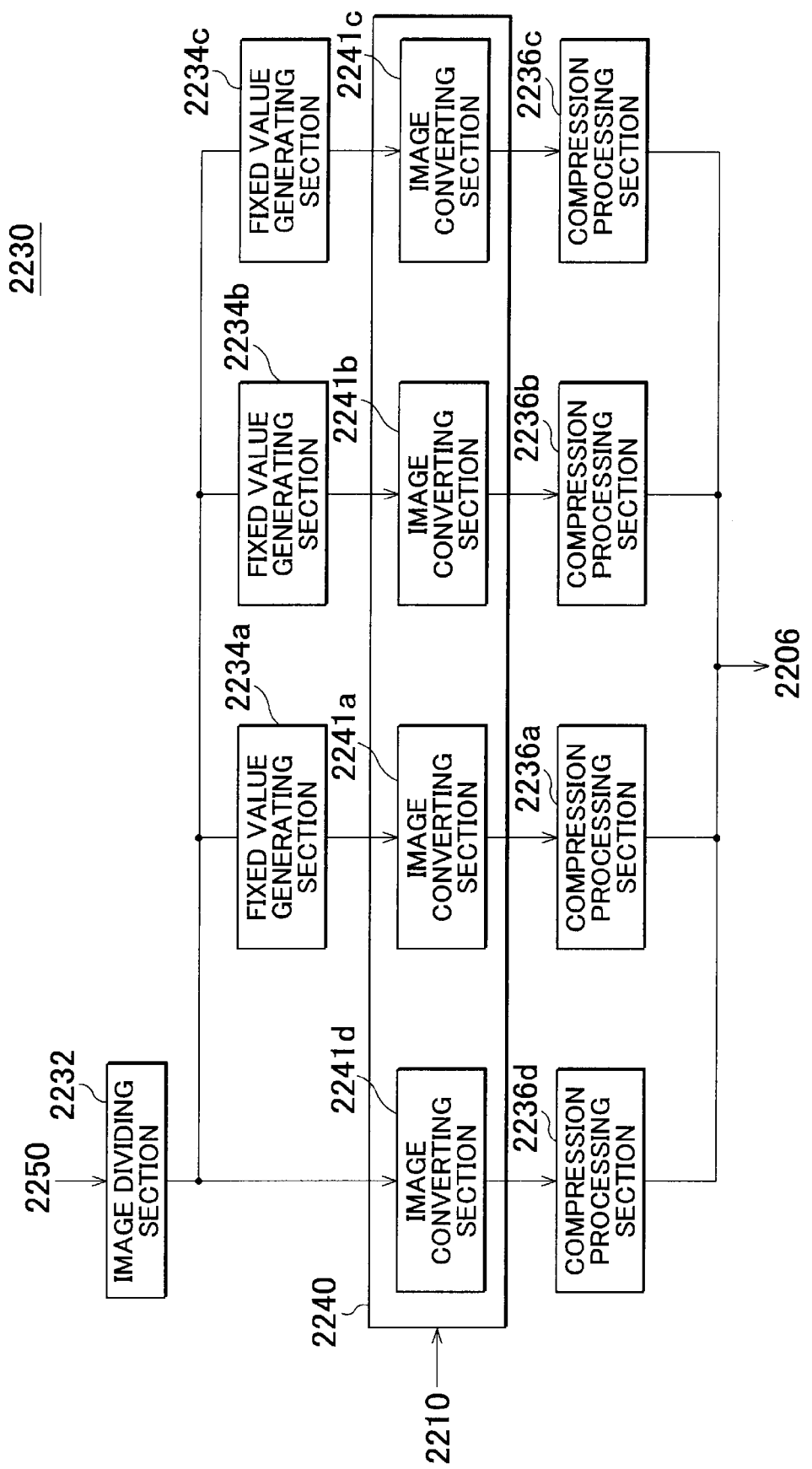
FIG. 17 shows an example of a block configuration of a compression section 2230.

FIG. 17 shows another example of a block configuration of a compression section 2230. The compression section 2230 includes an image dividing section 2232, a plurality of fixed value generating sections 2234a-c (hereinafter occasionally collectively referred to as "fixed value generating section 2234"), an image quality converting unit 2240 that includes a plurality of image quality converting sections 2241a-d (hereinafter collectively referred to as "image quality converting section 2241"), and a plurality of compression processing sections 2236a-d (hereinafter occasionally collectively referred to as "compression processing section 2236").

The image dividing section 2232 obtains a plurality of captured image from the image obtaining section 2250. Then, the image dividing section 2232 divides characteristic regions from a background region other than the characteristic region, in the plurality of captured images. Specifically, the image dividing section 2232 divides each of a plurality of characteristic regions from a background region other than the characteristic regions, in the plurality of captured images. In this way, the image dividing section 2232 divides characteristic regions from a background region in each of the plurality of captured images.

The compression processing section 2236 compresses a characteristic region image that is an image of a characteristic region and a background region image that is an image of a background region at different degrees from each other. Specifically, the compression processing section 2236 compresses a characteristic region moving image including a plurality of characteristic region images, and a background region moving image including a plurality of background region images at different degrees from each other.

Specifically, the image dividing section 2232 divides a plurality of captured images to generate a characteristic region moving image for each of a plurality of characteristic types. The fixed value generating section 2234 generates, for each characteristic region image included in a plurality of characteristic region moving images respectively generated according to characteristic types, a fixed value of a pixel value of a region other than a characteristic region of each characteristic type. Specifically, the fixed value generating section 2234 sets the pixel value of the region other than the characteristic region to be a predetermined pixel value.

The image quality converting section 2241 converts the image quality of an image of a characteristic region and of an image of a background region. For example, the image quality converting section 2241 converts at least one of the resolution, the number of gradations, the dynamic range, or the number of included colors, for each of images of characteristic regions and an image of a background region resulting from the division. Then, the compression processing section 2236 compresses the plurality of characteristic region moving images for each characteristic type. For example, the compression processing section 2236 MPEG compresses the plurality of characteristic region moving images for each characteristic type.

Note that the fixed value generating sections 2234a, 2234b, and 2234c respectively perform the fixed value processing on the characteristic region moving image of the first characteristic type, the characteristic region moving image of the second characteristic type, and the characteristic region moving image of the third characteristic type. The image quality converting sections 2241a, 2241b, 2241c, and 2241d respectively convert the image qualities of the characteristic region moving image of the first characteristic type, the characteristic region moving image of the second characteristic type, the characteristic region moving image of the third characteristic type, and the background region moving image. Then, the compression processing sections 2236a, 2236b, 2236c, and 2236d compress the characteristic region moving image of the first characteristic type, the characteristic region moving image of the second characteristic type, the characteristic region moving image of the third characteristic type, and the background region moving image.

Note that the compression processing sections 2236a-c compress a characteristic region moving image at a predetermined degree according to a characteristic type. For example, the compression processing section 2236 may convert characteristic region moving images into respectively different resolutions predetermined according to characteristic types, and compress the converted characteristic region moving images. When compressing the characteristic region moving image using MPEG encoding, the compression processing section 2236 may also compress the characteristic region moving images with respectively different quantization parameters predetermined according to characteristic types.

Note that the compression processing section 2236d compresses a background region moving image. Note that the compression processing sections 2236d may compress a background region moving image at a degree higher than any degree adopted by the compression processing sections 2236a-c. The characteristic region moving image and the background region moving image compressed by the compression processing section 2236 are supplied to the correspondence processing section 2206.

Since the region other than the characteristic region has been subjected to the fixed value processing by the fixed value generating section 2234, when the compression processing section 2236 performs prediction coding such as MPEG encoding, the amount of difference between the image and the predicted image in the region other than the characteristic region can be substantially reduced. Therefore, the compression ratio of the characteristic region moving image can be substantially enhanced.

In this way, by reducing the image quality of the captured image, the compression section 2230 generates an image to be an input image to the image processing apparatus 2170. Specifically, the compression section 2230 generates an image to be an input image to the image processing apparatus 2170, such as by reducing the resolution, the number of gradations, and the number of used colors of the captured image. In addition, the compression section 2230 may for example generate an image to be an input image to the image processing apparatus 2170, by lowering the spatial frequency component in the captured image.

Note that in this drawing, each of the plurality of compression processing sections 2236 included in the compression section 2230 compresses the images of the plurality of characteristic regions and the image of the background region. However, in another embodiment, the compression section 2230 may include a single compression processing section 2236, and this single compression processing section 2236 may compress the images of the plurality of characteristic regions and the image of the background region at respectively different degrees. For example, an arrangement is possible in which the images of the plurality of characteristic regions and the image of the background region are sequentially supplied in time division to the single compression processing section 2236, and the single compression processing section 2236 sequentially compresses the images of the plurality of characteristic regions and the image of the background region at respectively different degrees.

Alternatively, a single compression processing section 2236 may compress the images of the plurality of characteristic regions and the image of the background region at different degrees from each other, by respectively quantizing the image information of the plurality of characteristic regions and the image information of the background region at different quantization factors from each other. An arrangement is also possible in which the images resulting from converting the images of the plurality of characteristic regions and the image of the background region are converted into respectively different image qualities are supplied to the single compression processing section 2236, and the single compression processing section 2236 compresses the images of the plurality of characteristic regions and the image of the background region respectively. Note that this image quality conversion may be performed by a single image quality converting unit 2240. Also in such an embodiment described above in which a single compression processing section 2236 performs quantization using different quantization factors for each of regions and the images converted into different image qualities for each of regions are converted by a single compression processing section 2236, the single compression processing section 2236 may compress a single image, or may compress the images divided by the image dividing section 2232 respectively as in the present drawing. Note that when a single compression processing section 2236 compresses a single image, the dividing processing by the image dividing section 2232 and the fixed value processing by the fixed value generating section 2234 are unnecessary, and so the compression section 2230 does not have to include any image dividing section 2232 or fixed value generating section 2234.

Figure 18:
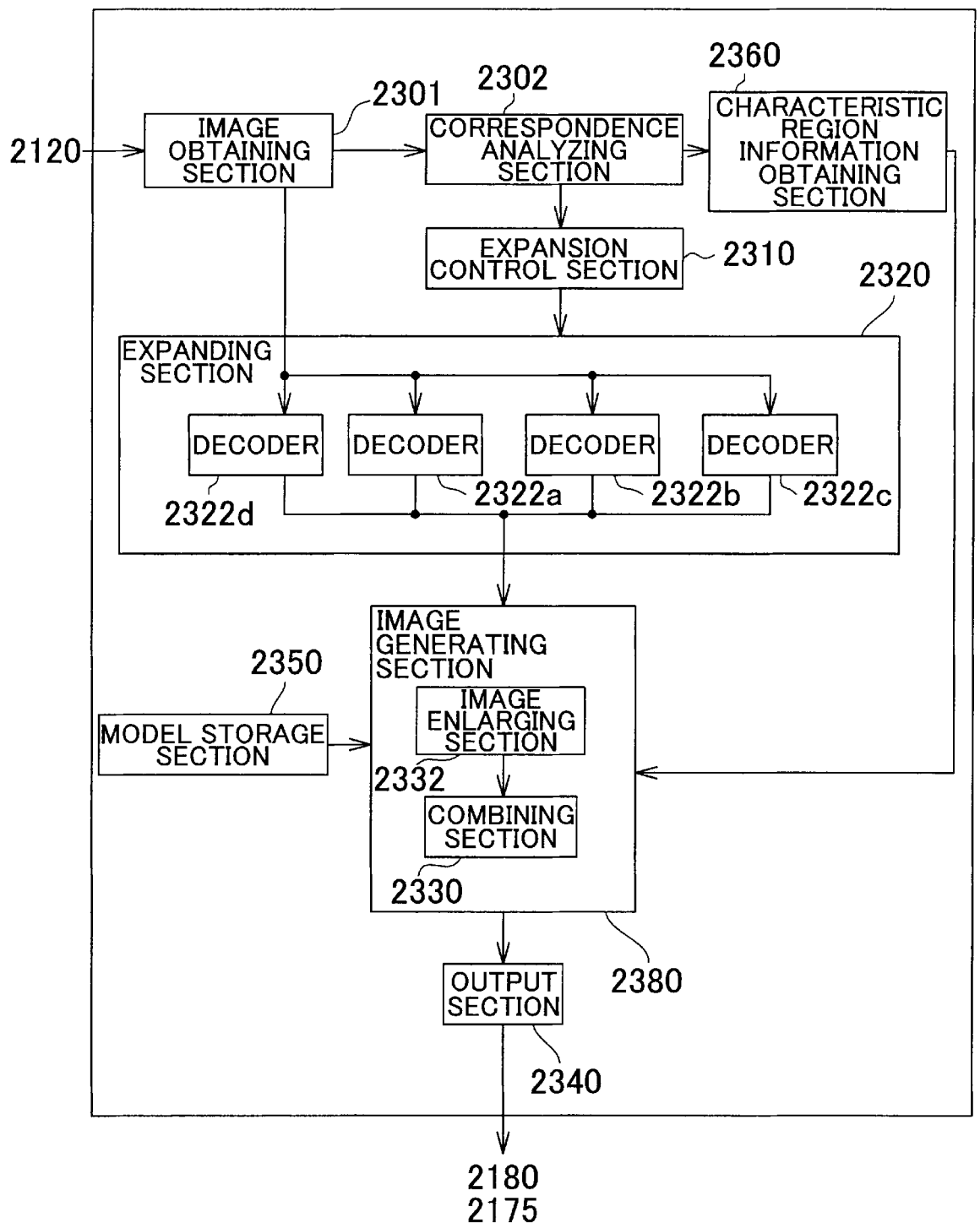
FIG. 18 shows an example of a block configuration of an image processing apparatus 2170.

FIG. 18 shows an example of a block configuration of an image processing apparatus 2170. The image processing apparatus 2170 includes an image obtaining section 2301, a correspondence analyzing section 2302, an expansion control section 2310, an expanding section 2320, an image generating section 2380, a characteristic region information obtaining section 2360, a model storage section 2350, and an output section 2340. The image generating section 2380 includes an enlarging section 2332 and a combining section 2330.

The image obtaining section 2301 obtains a compressed moving image compressed by the compression section 2230. Specifically, the image obtaining section 2301 obtains a compressed moving image including a plurality of characteristic region moving images and a background region moving image. More specifically, the image obtaining section 2301 obtains a compressed moving image to which attached are characteristic region information and a character parameter. In this way, the image obtaining section 2301 obtains, from the output section 2207, the value of the character parameter and the captured image whose image quality has been lowered. Specifically, the image obtaining section 2301 obtains the captured image whose image quality has been lowered in the region other than the characteristic region, and the value of the character parameter.

The correspondence analyzing section 2302 then separates the moving image data obtained by the image obtaining section 2301, into a plurality of characteristic region moving images and a background region moving image, characteristic region information, and a characteristic region parameter value, and supplies the plurality of characteristic region moving images and the background region moving image to the expanding section 2320. In addition, the correspondence analyzing section 2302 supplies the position of the characteristic region and the characteristic type to the expansion control section 2310 and the characteristic region information obtaining section 2360. In addition, the correspondence analyzing section 2302 supplies the value of the character parameter to the characteristic region information obtaining section 2360. In this way, the characteristic region information obtaining section 2360 can obtain the information indicating a characteristic region in each of a plurality of captured images (i.e., information indicating a position of a characteristic region) and the value of the character parameter. The characteristic region information obtaining section 2360 supplies, to the image generating section 2380, the information indicating the position of the characteristic region and the value of the character parameter.

The expansion control section 2310 controls the expanding processing by the expanding section 2320, according to the position of the characteristic region and the characteristic type obtained from the correspondence analyzing section 2302. For example, the expansion control section 2310 controls the expanding section 2320 to expand each region of a moving image represented by the compressed moving image, according to a compression method adopted by the compression section 2230 in compressing each region of the moving image according to the position of the characteristic region and the characteristic type.

The following explains the operation of each constituting element of the expanding section 2320. The expanding section 2320 includes a plurality of decoders 2322*a-d* (hereinafter collectively referred to as "decoder 2322"). The decoder 2322 decodes one of the plurality of characteristic region moving images and the background region moving image, which have been encoded. Specifically, the decoders 2322*a*, 2322*b*, 2322*c*, and 2322*d* respectively decode the first, second, third characteristic region moving images and a background region moving image. The expanding section 2320 supplies the first, second, third characteristic region moving images and the background region moving image, which have been decoded, to the image generating section 2380.

The image generating section 2380 generates a single moving image for display based on the first, second, third characteristic region moving images, the background region moving image, and the characteristic region information. The output section 2340 then outputs the characteristic region information obtained from the correspondence analyzing section 2302 and the moving image for display to the display apparatus 2180 or to the image DB 2175. Note that the image DB 2175 may record, in a nonvolatile recording medium such as a hard disk, the position, the characteristic type, and the number of characteristic region(s) indicated by the characteristic region information, in association with information identifying the captured image included in the moving image for display. Note that the output section 2340 can function as an image output section in the present invention.

The model storage section 2350 stores the model that is the same as the model stored in the model storage section 2270. The image generating section 2380 may generate a high image quality image of the object included in the characteristic region, by adapting the image of the object included in the characteristic region to the model stored in the model storage section 2350. Specifically, the image generating section 2380 may generate a high image quality image of the object by weighting the principal component vector stored in the model storage section 2350, with a weighting factor which is an example of the value of the character parameter. In this way, the image generating section 2380 generates the image of the object included in the image of the characteristic region, based on the value of the character parameter.

Note that the parameter value calculating section 2260 may calculate the value of the character parameter in the model, representing the form of the object captured in the image of the characteristic region, by adapting the image of the object included in the image of the characteristic region in the captured image, to the model stored in the model storage section 2270. Then, the compression section 2230 may compress the captured image by lowering the image quality of the characteristic region and the region other than the characteristic region in the captured image. The output section 2207 may output the value of the character parameter calculated by the parameter value calculating section 2260 and the captured image whose image quality has been lowered by the compression section 2230.

In this case, the image generating section 2380 generates the image of the object included in the image of the characteristic region, by generating the form of the object included in the image of the characteristic region from the model based on the value of the character parameter, and using the generated form of the object and the pixel value of the image of the characteristic region in the captured image obtained by the image obtaining section 2250. Specifically, the image generating section 2380 generates the image of the object included in the image of the characteristic region, by generating the form of the object included in the image of the characteristic region from the model based on the value of the character parameter, and using the generated form of the object and the pixel value of the image of the characteristic region expanded by the expanding section 2320.

Note that the characteristic region information obtaining section 2360 may obtain the type of the object, the direction of the object, and the illumination condition outputted by the output section 2207 in association with the compressed moving image. The image generating section 2380 may generate a high image quality image of an object, by weighting the principal component vector stored in the model storage section 2350 in association with the type of the object, the direction of the object, and the illumination condition, using the weighting factor obtained by the characteristic region information obtaining section 2360.

The image enlarging section 2332 enlarges the image of the region other than the characteristic region. The combining section 2330 combines the high image quality image of the object in the characteristic region and the image of the enlarged region other than the characteristic region.

Then, the output section 2340 outputs an image including the high image quality image and the image other than the characteristic region. Specifically, the output section 2340 outputs a moving image for display that includes, as a moving image constituting image, a captured image obtained by the combining section 2330 in the above-explained manner.

Figure 19:
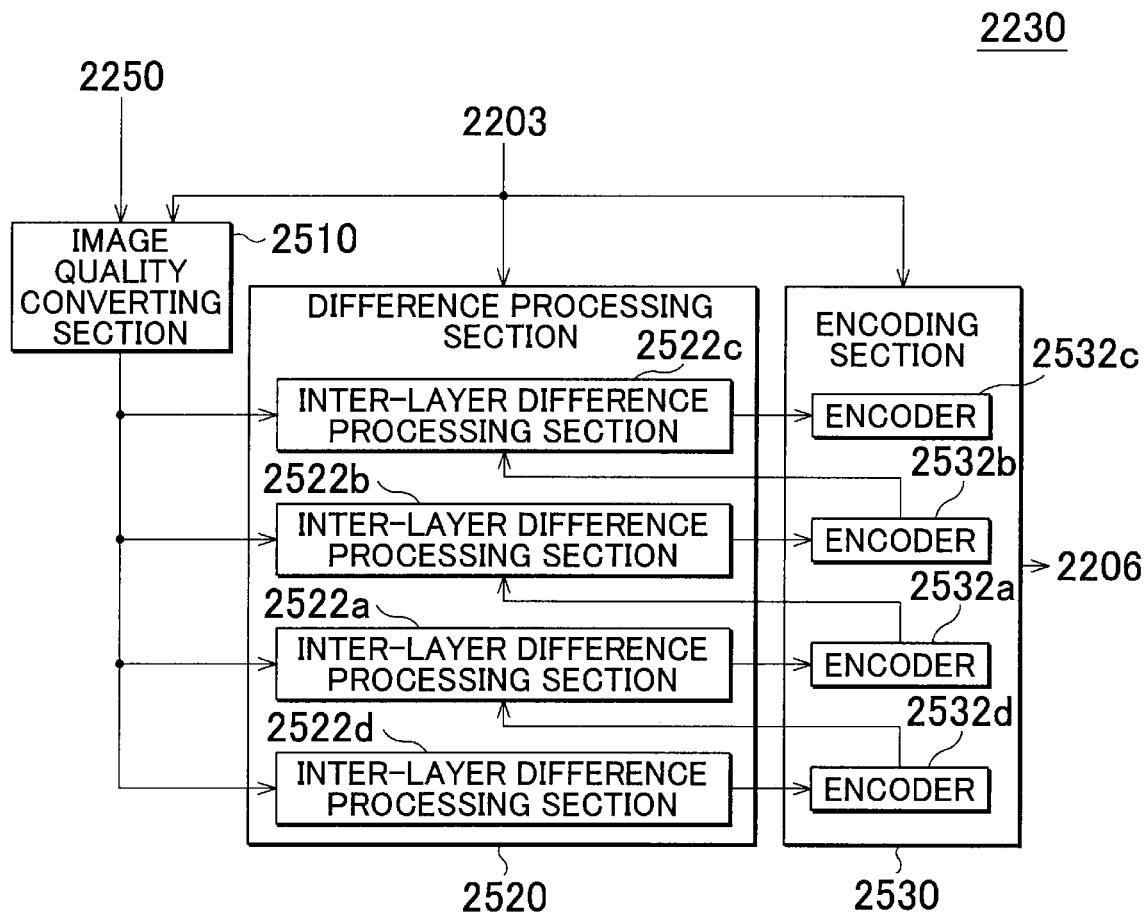
FIG. 19 shows an example of another block configuration of the compression section 2230.

FIG. 19 shows an example of another block configuration of the compression section 2230. The compression section 2230 in the present configuration compresses a plurality of captured images by means of coding processing that is spatio scalable according to the characteristic type.

The compression section 2230 in the present configuration includes an image quality converting section 2510, a difference processing section 2520, and an encoding section 2530. The difference processing section 2520 includes a plurality of inter-layer difference processing sections 2522a-d (hereinafter collectively referred to as "inter-layer difference processing section 2522"). The encoding section 2530 includes a plurality of encoders 2532a-d (hereinafter collectively referred to as "encoder 2532").

The image quality converting section 2510 obtains a plurality of captured images from the image generating section 2250. In addition, the image quality converting section 2510 obtains information identifying the characteristic region detected by the characteristic region detecting section 2203 and information identifying the characteristic type of the characteristic region. The image quality converting section 2510 then generates the captured images in number corresponding to the number of characteristic types of the characteristic regions, by copying the captured images. The image quality converting section 2510 converts the generated captured images into images of resolution according to the respective characteristic types.

For example, the image quality converting section 2510 generates a captured image converted into resolution according to a background region (hereinafter referred to as "low resolution image"), a captured image converted into first resolution according to a first characteristic type (hereinafter referred to as "first resolution image"), a captured image converted into second resolution according to a second characteristic type (hereinafter referred to as "second resolution image"), and a captured image converted into third resolution according to a third characteristic type (hereinafter referred to as "third resolution image"). Here, the first resolution image has a higher resolution than the resolution of the low resolution image, and the second resolution image has a higher resolution than the resolution of the first resolution image, and the third resolution image has a higher resolution than the resolution of the second resolution image.

The image quality converting section 2510 supplies the low resolution image, the first resolution image, the second resolution image, and the third resolution image, respectively to the inter-layer difference processing section 2522d, the inter-layer difference processing section 2522a, the inter-layer difference processing section 2522b, and the inter-layer difference processing section 2522c. Note that the image quality converting section 2510 supplies a moving image to each of the inter-layer difference processing sections 2522 as a result of performing the image quality converting processing to each of the plurality of captured images.

Note that the image quality converting section 2510 may convert the frame rate of the moving image supplied to each of the inter-layer difference processing sections 2522 according to the characteristic type of the characteristic region. For example, the image quality converting section 2510 may supply, to the inter-layer difference processing section 2522d, the moving image having a frame rate lower than the frame rate of the moving image supplied to the inter-layer difference processing section 2522a. In addition, the image quality converting section 2510 may supply, to the inter-layer difference processing section 2522a, the moving image having a frame rate lower than the frame rate of the moving image supplied to the inter-layer difference processing section 2522b, and may supply, to the inter-layer difference processing section 2522b, the moving image having a frame rate lower than the frame rate of the moving image supplied to the inter-layer difference processing section 2522c. Note that the image quality converting section 2510 may convert the frame rate of the moving image supplied to the inter-layer difference processing section 2522, by thinning the captured images according to the characteristic type of the characteristic region. Note that the image quality converting section 2510 may perform the similar image conversion to the image quality converting section 2241 explained with reference to FIG. 17.

The inter-layer difference processing section 2522d and the encoder 2532d perform prediction coding on the background region moving image including a plurality of low resolution images. Specifically, the inter-layer difference processing section 2522 generates a differential image representing a difference from the predicted image generated from the other low resolution images. Then, the encoder 2532d quantizes the conversion factor obtained by converting the differential image into spatial frequency component, and encodes the quantized conversion factor using entropy coding or the like. Note that such prediction coding processing may be performed for each partial region of a low resolution image.

In addition, the inter-layer difference processing section 2522a performs prediction coding on the first characteristic region moving image including a plurality of first resolution images supplied from the image quality converting section 2510. Likewise, the inter-layer difference processing section 2522b and the inter-layer difference processing section 2522c respectively perform prediction coding on the second characteristic region moving image including a plurality of second resolution images and on the third characteristic region moving image including a plurality of third resolution images. The following explains the concrete operation performed by the inter-layer difference processing section 2522a and the encoder 2532a.

The inter-layer difference processing section 2522a decodes the first resolution image having been encoded by the encoder 2532d, and enlarges the decoded image to an image having a same resolution as the first resolution. Then, the inter-layer difference processing section 2522a generates a differential image representing a difference between the enlarged image and the low resolution image. During this operation, the inter-layer difference processing section 2522a sets the differential value in the background region to be 0. Then, the encoder 2532a encodes the differential image just as the encoder 2532d has done. Note that the encoding processing may be performed by the inter-layer difference processing section 2522a and the encoder 2532a for each partial region of the first resolution image.

When encoding the first resolution image, the inter-layer difference processing section 2522a compares the amount of encoding predicted to result by encoding the differential image representing the difference from the low resolution image and the amount of encoding predicted to result by encoding the differential image representing the difference from the predicted image generated from the other first resolution image. When the latter amount of encoding is smaller than the former, the inter-layer difference processing section 2522a generates the differential image representing the difference from the predicted image generated from the other first resolution image. When the encoding amount of the first resolution image is predicted to be smaller as it is without taking any difference with the low resolution image or with the predicted image, the inter-layer difference processing section 2522a does not have to calculate the difference from the low resolution image or the predicted image.

Note that the inter-layer difference processing section 2522a does not have to set the differential value in the background region to be 0. In this case, the encoder 2532a may set the data after encoding with respect to the information on difference in the non-characteristic region to be 0. For example, the encoder 2532a may set the conversion factor after converting to the frequency component to be 0. When the inter-layer difference processing section 2522d has performed prediction coding, the motion vector information is supplied to the inter-layer difference processing section 2522a. The inter-layer difference processing section 2522a may calculate the motion vector for a predicted image, using the motion vector information supplied from the inter-layer difference processing section 2522d.

Note that the operation performed by the inter-layer difference processing section 2522b and the encoder 2532b is substantially the same as the operation performed by the inter-layer difference processing section 2522a and the encoder 2532a, except that the second resolution image is encoded, and when the second resolution image is encoded, the difference from the first resolution image after encoding by the encoder 2532a may be occasionally calculated, and so is not explained below. Likewise, the operation performed by the inter-layer difference processing section 2522c and the encoder 2532c is substantially the same as the operation performed by the inter-layer difference processing section 2522a and the encoder 2532a, except that the third resolution image is encoded, and when the third resolution image is encoded, the difference from the second resolution image after encoding by the encoder 2532b may be occasionally calculated, and so is not explained below.

As explained above, the image quality converting section 2510 generates, from each of the plurality of captured images, a low image quality image and a characteristic region image having a higher image quality than the low image quality image at least in the characteristic region. The difference processing section 2520 generates a characteristic region differential image being a differential image representing a difference between the image of the characteristic region in the characteristic region image and the image of the characteristic region in the low image quality image. Then, the encoding section 2530 encodes the characteristic region differential image and the low image quality image respectively.

The image quality converting section 2510 also generates low image quality images resulting from lowering the resolution of the plurality of captured images, and the difference processing section 2520 generates a characteristic region differential image representing a difference between the image of the characteristic region in the characteristic region image and the image resulting from enlarging the image of the characteristic region in the low image quality image. In addition, the difference processing section 2520 generates a characteristic region differential image having a characteristic region and a non-characteristic region, where the characteristic region has a spatial frequency component corresponding to a difference between the characteristic region image and the enlarged image converted into a spatial frequency region, and an amount of data for the spatial frequency component is reduced in the non-characteristic region.

As explained above, the compression section 2230 can perform hierarchical encoding by encoding the difference between the plurality of inter-layer images having different resolutions from each other. As can be understood, a part of the compression method adopted by the compression section 2230 in the present configuration includes the compression method according to H.264/SVC. Note that to expand such a hierarchically compressed moving image, the image processing apparatus 2170 can generate a captured image having an original resolution by decoding the moving image data of each layer and adding the decoded captured image in the layer for which the difference was taken in the region for which encoding was performed using the inter-layer difference.

FIG. 20 shows an example of a characteristic point in a human face. As explained above with reference to FIG. 16 and FIG. 17, the model storage section 2270 and the model storage section 2350 store the model using the character parameter to express the object. The following explains a method of utilizing an AAM method in generating the model of a face of a person that is an example of the object, as an example of a generating method of generating a model stored by the model storage section 2270 and the model storage section 2350.

"n" characteristic points representing the facial form are set with respect to each of the plurality of facial images (hereinafter referred to as "sample image") representing a facial portion of a person as a sample. Note that the number of characteristic points is assumed to be smaller than the pixel number of the facial image. Each characteristic point may be determined in advance to show a portion of the face such that the first characteristic point represents the left end of the left eye, the eleventh characteristic point represents the center between the eye brows, and so on. In addition, each characteristic point may be set manually, or automatically by recognition processing.

Then, based on the characteristic points set in each sample image, the average form of the face is calculated. Specifically, the average of the positional coordinates for each characteristic point showing the same portion is obtained in each sample image. Then, the principal component analysis is performed based on the positional coordinates of the characteristic points representing the facial form in each sample image and its average form. As a result, a facial form S can be expressed as $S=S_0+\Sigma p_i b_i$ (i=1–n).

Here, "S" represents a form vector represented by arranging the positional coordinates of each characteristic point of the facial form $(x1, y1, \ldots, x_n, y_n)$, "$S_0$" represents an average facial form vector represented by arranging the positional coordinates of each characteristic point in the average facial form, "$p_i$" represents an eigenvector showing the i-th principal component of the facial form obtained by the principal component analysis, and "$b_i$" represents the weighting factor for each eigenvector $p_i$.

Figure 21A:
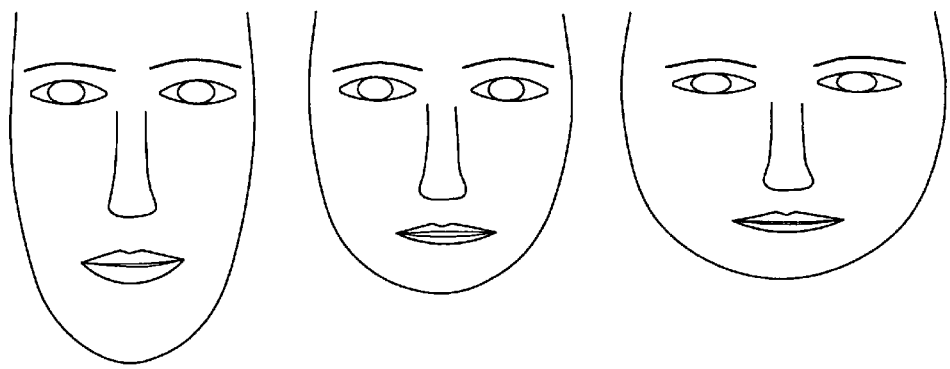
FIG. 21A and FIG. 21B schematically show an example of change in facial form when a weighting factor b is changed.
Figure 21B:
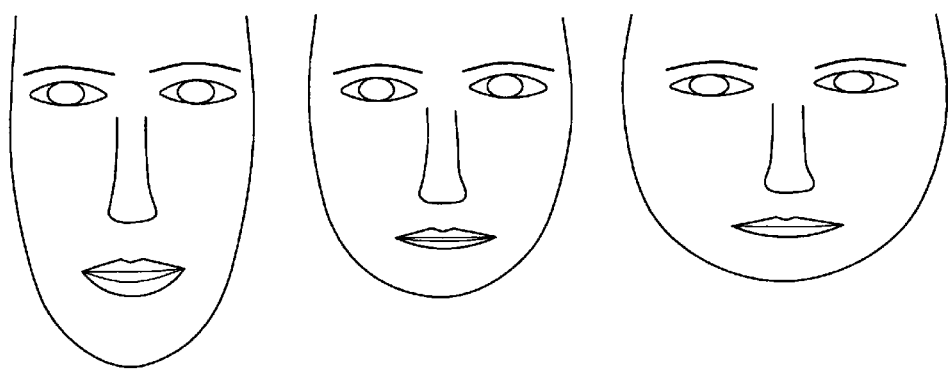

FIG. 21A and FIG. 21B schematically show an example of change in facial form when a weighting factor b is changed. The present drawings schematically show the change in facial form in changing the values of the weighting factors $b_1$ and $b_2$ with respect to the eigenvectors $p_1$, $p_2$ of the upper two principal components obtained by the principal component analysis. FIG. 21A shows change in facial form when the weighting factor $b_1$ is changed, and FIG. 21B shows change in facial form when the weighting factor $b_2$ is changed. In each case of FIG. 21A and FIG. 21B, the center of three facial forms for each principal component shows an average facial form.

In this case, the component contributing to the outline form of the face is extracted as the first principal component, as a result of the principal component analysis. By changing the weighting factor $b_1$, the facial form changes from a) the thin face shown in the left end to a) the round face shown in the right end. As the second principal component, the components contributing to the open/close state of the mouth and the length of the chin are extracted, and so by changing the weighting factor $b_2$, the facial form changes from b) the long chin with the mouth open in the left end to b) the short chin with the mouth closed in the right end. Note that each person may interpret differently as to which element of form a principal component contributes. The principal component analysis enables to extract a principal component expressing a larger difference in form in each used sample image, as a lower-order principal component.

FIG. 22 shows an example of an image obtained by converting a sample image into an average facial form. Each sample image is converted (warped) into an average facial form. Concretely, the amount of shift between each sample image and an average facial form is calculated for each characteristic point. Then using thus calculated amount of shift, the amount of shift of each sample image to an average facial form for each pixel is calculated, to warp each sample image to an average facial form for each pixel.

Then, the principal component analysis is conducted using, as a variable, the pixel value of the color component of R, G, B of each pixel of each sample image after conversion into an average facial form. As a result, the pixel value of the color component of R, G, B in the average facial form of an arbitrary facial image can be approximated using an expression $A=A_0+\Sigma q_i \lambda_i$ (i=1–m).

Here, "A" represents the vector (r1, g1, b1, r2, g2, b2, ..., rm, gm, bm) represented by arranging each pixel value of R, G, B color components of each pixel in an average form. Note that "r," "g," and "b" represent the pixel value of R, G, B color components respectively, 1–m represent a suffix identifying each pixel, and "m" represents the total number of pixels in the average facial form. Note that the order of arrangement of the vector components is not limited as stated above.

In addition, $A_0$ represents an average vector represented by arranging the average of each pixel value of R, G, B color components of each pixel of each sample image in the average facial form, $q_i$ represents an eigenvector representing i-th principal component for the pixel value of R, G, B color components of the face obtained by the principal component analysis, and $\lambda_i$ represents a weighting factor for each eigenvector $q_i$.

FIG. 23A and FIG. 23B schematically show an example of change in pixel value when a weighting factor q is changed. The present drawings schematically show the change in pixel value of the face in changing the values of the weighting factors $\lambda_1$ and $\lambda_2$ with respect to the eigenvectors $q_1$, $q_2$ of the upper two principal components obtained by the principal component analysis. FIG. 23A shows change in pixel value when the weighting factor $\lambda_1$ is changed, and FIG. 23B shows change in pixel value when the weighting factor $\lambda_2$ is changed. In each case of FIG. 23A and FIG. 23B, the center of three facial forms for each principal component shows an average pixel value.

In the present example, the component contributing whether there is beards is extracted as the first principal component, as a result of the principal component analysis. By changing the weighting factor $\lambda_1$, the face changes from a) the beardless face shown in the left end to a) the face with thick beards shown in the right end. As the second principal component, the component contributing to the thickness of the eyebrow is extracted, and so by changing the weighting factor $\lambda_2$, the face changes from b) the face with scarce eyebrow at the left end to b) the face with thick eyebrow at the right end.

The processing explained with reference to FIG. 20 through FIGS. 23A-23B enables to generate the facial model.

The model represents a face by a plurality of eigenvectors $p_i$ representing the facial form and an eigenvector $q_i$ representing the pixel value of the face in the average facial form. The summation value of each eigenvector of the model is substantially smaller than the number of pixels forming the facial image. Note that in the above-stated example, different weighting factors $b_i$, $\lambda_i$ are used for the facial form and the pixel values of R, G, B color components to express different facial images, since there is correlation between variations of the facial form and the color component pixel values, it is also possible to perform principal component analysis on the character parameter including both of the characteristic point and the pixel value.

The following shows an example of processing of compressing the image of the object included in the characteristic region using the model stored in the model storage section 2270. The parameter value calculating section 2260 normalizes the input facial image included in the characteristic region, to calculate the pixel value of the R, G, B color component in the average facial form. Note that the input facial image is not always taken from the front, or may be taken under an illumination condition different from the illumination condition under which the sample image was taken. Therefore, not limited to processing to align the characteristic points of the front face as stated above, the normalization in this specification also includes converting into the facial image captured under the same image capturing environment as that of the sample image, such as conversion processing for converting the direction of the input facial image as taken from the slanting direction into the facial image as taken from the front, and shadow removal processing to remove the effect of the shadow due to illumination.

The parameter value calculating section 2260 calculates the weighting factor $\lambda_i$ by projecting the pixel value difference from the average face onto the principal component vector $q_i$. Specifically, the parameter value calculating section 2260 can calculate the weighting factor $\lambda_i$ by the inner product with the principal component vector $q_i$. In addition, the parameter value calculating section 2260 calculates the characteristic point S of the face using the similar processing as the above-described calculation of the pixel value A. Specifically, the parameter value calculating section 2260 calculates the weighting factor $b_i$ by projecting the difference in position of the characteristic points from the average face on the principal component vector $p_i$.

As explained above, the parameter value calculating section 2260 can calculate the weighting factors $b_i$ and $\lambda_i$ as the value of the character parameter. The following explains generation of the high image quality image performed by the image generating section 2380.

The image generating section 2380 uses the obtained weighting factor $\lambda_i$ the pixel value $A_0$ of the average face, and the principal component vector $q_i$, to calculate the pixel value "A" in the average facial form. In addition, the image generating section 2380 calculates the characteristic point "A" using the obtained weighting factor $b_i$, the characteristic point $S_0$ of the average face, and the principal component vector $p_i$. Then, the image generating section 2380 performs inverse conversion of the above-described normalization processing excluding the processing to align the characteristic points, onto the image represented by the pixel value "A" and the characteristic point "A." Note that the normalization processing explained above may be transmitted from the image processing apparatus 2120 to the image processing apparatus 2170, to be used by the image generating section 2380 when performing the inverse conversion explained above.

According to the above-described processing, the image generating section 2380 generates a high image quality image having a higher image quality than the image quality of the captured image, based on the image of the characteristic region in the captured image outputted from the output section 2207. Specifically, the image generating section 2380 may generate an image of a higher resolution, a sharper image, an image having less noise, an image having more number of gradations, or an image having a larger number of colors, than the captured image outputted from the output section 2207.

FIG. 24 shows, in a table format, an example of a model stored in a model storage section 2270 and a model storage section 2350. The model storage section 2270 and the model storage section 2350 store a model for each combination of expression and direction. Exemplary expressions include faces in each state of delight, anger, sorrow, and pleasure, and a sober face, and exemplary directions include front, upper, lower, right, left, and back.

The parameter value calculating section 2260 can identify the expression of the face and the direction of the face, based on the facial image included in the characteristic region, and calculate the above-described weighting factor using the model stored in the model storage section 2270 in association with the identified combination of expression and direction.

Note that the output section 2207 may transmit information identifying the used model, to the information processing apparatus 2170. Then, the image generating section 2380 can perform the above-described reconstruction processing using the model identified by the information.

Note that the image generating section 2380 may identify the expression from the form of the mouth and/or the eyes, and may identify the facial direction based on such as the positional relation of the eyes, the mouth, the nose, and the ears. Note that the image processing apparatus 2120 may be used to identify the facial expression and the facial direction, and the output section 2207 may be used to output the facial expression and the facial direction in association with the captured image.

Moreover, the model storage section 2270 and the model storage section 2350 may store the model in association with the illumination condition, as well as in association with the facial expression and the facial direction. For example, the model storage section 2270 and the model storage section 2350 may store the model in association with the strength and the direction of the illumination. The parameter value calculating section 2260 identifies the illumination condition for the face based on the facial image included in the characteristic region. For example, the parameter value calculating section 2260 may identify the strength and direction of the illumination based on the position and size of the shadow, and calculate the weighting factor using the model stored in the model storage section 2270 in association with the identified strength and direction of the illumination.

The above-described example has stated generation of a model for expressing the entire face, character parameter extraction and reconstruction using the model. However not limited to the model for the entire face, the image processing system 2010 may also use a model for each portion of a face. The image processing system 2010 may also use a model of a face different for each sex and/or race (or each portion of these faces). Furthermore, not limited to a human model as stated above, the image processing system 2010 may store the model for each type of object under monitoring (e.g., vehicle and ship) by the image processing system 2010. The image generating section 2380 may perform reconstruction by selecting a model according to the type of object. The types of object may be detected in the image processing apparatus 2120 to be transmitted to the image processing apparatus 2170 in association with the captured image.

As explained above, the model storage section 2270 and the model storage section 2350 may store models of different types of object in association with the types. The characteristic region information obtaining section 2360 obtains information indicating the type of object included in the characteristic region in the inputted image. The image generating section 2380 converts, into a high image quality image, the image of the object included in the characteristic region in the captured image, by adapting it to the model stored in the model storage section 2350 in association with the type of the object included in the characteristic region obtained by the characteristic region information obtaining section 2360.

As explained above, the model storage section 2270 and the model storage section 2350 store the model which is an example of the learning data, for each portion (e.g., eyes, nose, and mouth) of a face which is an example of the information identifying a type of object. Here, the learning data may include, other than the models described above, a low frequency component and a high frequency component of the image of the object respectively extracted from a multiple sample images of the object. Here, for each type of the plurality of objects, the low frequency component of the image of the object can be clustered into a plurality of clusters, by means of K-means or the like. In addition, a representative low frequency component (e.g., barycenter value) can be determined for each cluster. Note that the model storage section 2270 may store information identifying the high frequency component in association with the low frequency component of the image of the object. The model storage section 2350 may store the high frequency component in association with the information identifying the high frequency component.

The parameter value calculating section 2260 extracts the low frequency component from the image of the object included in the captured image. Then, the parameter value calculating section 2260 identifies the cluster whose representative low frequency component is determined to be the value matching the extracted low frequency component, from among the cluster of frequency components extracted from the sample images of the type of the object. The parameter value calculating section 2260 identifies information identifying the cluster of the high frequency component stored in the model storage section 2270 in association with the low frequency component included in the identified cluster. In this way, the parameter value calculating section 2260 can identify the cluster of the high frequency component correlated to the low frequency component extracted from the object included in the captured image. The information identifying the cluster of the high frequency component identified by the parameter value calculating section 2260 is outputted from the output section 2207 in association with the information identifying the characteristic region.

The information identifying the cluster of the high frequency component outputted from the output section 2207 and obtained by the image obtaining section 2301 is extracted by the correspondence analyzing section 2302, and is supplied to the image generating section 2380 via the characteristic region information obtaining section 2360. The image generating section 2380 may convert the image of the object into a higher quality image, by using the high frequency component representative of the cluster of the high frequency component stored in the model storage section 2350 in association with the information identifying the cluster of the high frequency component. For example, the image generating section 2380 may add, to the image of the object, the high frequency component selected for each object with a weight corresponding to the distance up to the processing target position on the face from the center of each object. Here, the representative high frequency component may be generated by closed-loop learning. In this way, the parameter value calculating section 2260 can select, for each object, desirable learning data from among the learning data generated by performing learning according to each object. Therefore, the image generating section 2380 can sometimes render the image of the object into high image quality with higher accuracy, since it can use desirable learning data selected for each object. Although the output section 2207 has outputted the information identifying the cluster of the high frequency component in the above example, the output section 2207 may output the information identifying the cluster of the low frequency component. In such a case, the model storage section 2350 stores the cluster of the high frequency component in association with the information identifying the cluster of the low frequency component. The image generating section 2380 may render the image of the object in high image quality, by adding, to the image of the object, the high frequency component representative of the cluster of the high frequency component stored in the model storage section 2350 in association with the information identifying the cluster of the low frequency component outputted from the output section 2207.

In this way, the image processing apparatus 2120 and the image processing apparatus 2170 can reconstruct the image of a characteristic region using a principal component analysis (PCA). Note that examples of the image reconstruction method by means of the image processing apparatuses 2120 and 2170 and the learning method thereof include, other than the learning and image reconstruction by means of principal component analysis (PCA), locality preserving projection (LPP), linear discriminant analysis (LDA), independent component analysis (ICA), multidimensional scaling (MDS), support vector machine (SVM) (support vector regression), neutral network, Hidden Markov Model (HMM), Bayes estimator, Maximum a posteriori, Iterative Back Projection Method, Wavelet Conversion, locally linear embedding (LLE), Markov random field (MRF), and so on.

Note that although the above example has explained the function and operation of each constituting element of the image processing system 2010 taking an example of the two dimensional model, the image processing system 2010 may also use a three-dimensional model. Specifically, the model storage section 2270 and the model storage section 2350 may store a three-dimensional model. Note that usage of the three-dimensional model can be realized by adding, to the above-explained vector "A," a z component representing the depth. For example, the three-dimensional model can be realized by setting the vector "A" to be ($r1$, $g1$, $b_1$, $z1$, $r2$, $g2$, $b_2$, $z2$, ..., rm, gm, bm, zm).

Note that the three-dimensional model stored in the model storage section 2270 and the model storage section 2350 may be generated by using the three-dimensional image generated from the plurality of sample images obtained by capturing images of an object from respectively different directions. For example, for each of three-dimensional images of the plurality of objects, the three-dimensional model can be generated using the same method as used in generating the above-explained two dimensional model. Then, the parameter value calculating section 2260 calculates the value of the character parameter by identifying the characteristic regions including the same object in respectively different directions, from among the characteristic regions in the plurality of captured images, and adapting, to the three-dimensional model, the three-dimensional image of the object included in the identified characteristic region based on the image of the object. Note that the parameter value calculating section 2260 can generate the three-dimensional image of the object, based on parallax information in the images of the same object captured in respectively different directions. Moreover, the direction in which the image of the object included in each characteristic region was captured can be identified based on the parallax information. The output section 2207 may output the image capturing direction in association with the image of the region other than the characteristic region and the value of the character parameter.

The image generating section 2380 generates the three-dimensional image of the object included in the images of the characteristic regions including the same object in respectively different directions, based on the value of the character parameter and from the three-dimensional model, and based on the generated three-dimensional image, generates the two dimensional image of the object included in the images of the characteristic regions. Note that the characteristic region information obtaining section 2360 obtains, through the image obtaining section 2301, the image capturing direction outputted from the output section 2207, and supplies the obtained image capturing direction to the image generating section 2380. The image generating section 2380 can generate the two dimensional image of the object by projection into a two dimensional space based on the image capturing direction and the three-dimensional image. Then, the output section 2340 outputs the two dimensional image generated by the image generating section 2380 and the image of the region other than the characteristic region obtained by the image obtaining section 2301. Note that the image capturing direction stated above is an example of direction information used for generating a two dimensional image from a three-dimensional image, and the direction information may be a projection angle at which three-dimensional data is projected onto a two dimensional space.

When the difference between the image of the object included in the captured image and the average image (e.g., average facial image) is larger than a predetermined value, the compression section 2230 can compress the image of the characteristic region. Accordingly, when the image of the object included in the characteristic region is largely different from the average image, substantial reduction in the reconstruction accuracy can be avoided.

Figure 25:
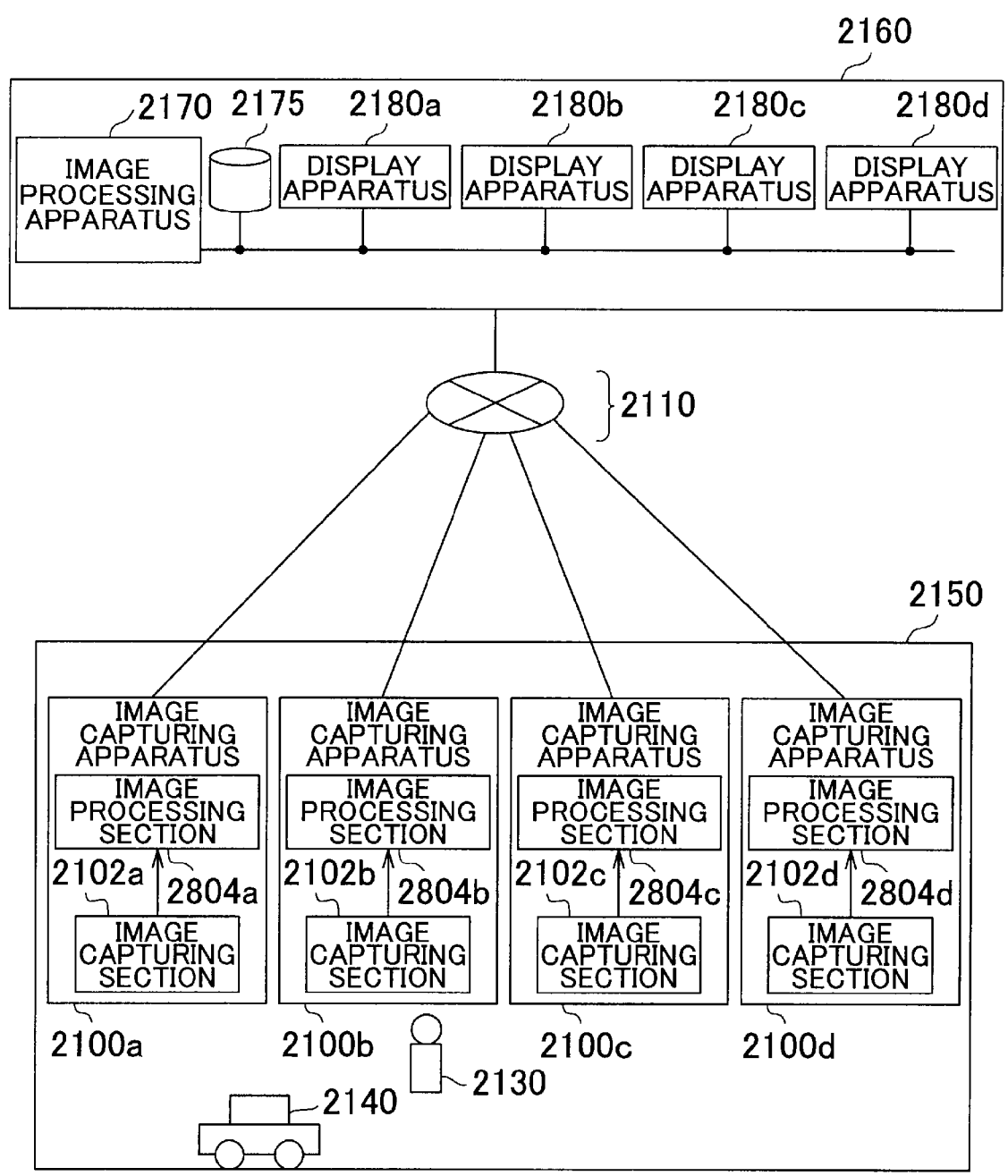
FIG. 25 shows an example of the image processing system 2020 according to another embodiment.

FIG. 25 shows an example of the image processing system 2020 according to another embodiment. The configuration of the image processing system 2020 in the present embodiment is the same as the configuration of the image processing system 2010 of FIG. 15, except that the image capturing apparatuses 2100a-d respectively include image processing sections 2804a-d (hereinafter collectively referred to as "image processing section 2804").

The image processing section 2804 includes all the constituting element of the image processing apparatus 2120 except for the image obtaining section 2250. The function and operation of each constituting element of the image processing section 2804 may be substantially the same as the function and operation of each constituting element of the image processing apparatus 2120, except that each constituting element of the image processing section 2804 processes the captured moving image captured by the image capturing section 2102 instead of processing the captured moving image obtained by expanding processing performed by the compressed moving image expanding section 2202. The image processing system 2010 having the stated configuration can also obtain substantially the same effect as the effect obtained by the image processing system 2010 explained above with reference to FIG. 15 through FIG. 24.

Note that the image processing section 2804 may obtain, from the image capturing section 2102, a captured moving image including a plurality of captured images represented in RAW format, and compress the plurality of captured images represented in RAW format (e.g., an image of a region other than a characteristic region) in the obtained captured moving image, as they are in the RAW format. Note that the image processing section 2804 may detect one or more characteristic regions from a plurality of captured images represented in RAW format. In addition, the image processing section 2804 may compress a captured moving image including a plurality of compressed captured images represented in RAW format. The image processing section 2804 can perform compression using a compression method explained above as the operation of the image processing apparatus 2120 with reference to FIG. 15 through FIG. 25. The image processing apparatus 2170 can obtain the plurality of captured images represented in RAW format (e.g., an image of a region other than a characteristic region), by expanding the moving image obtained from the image processing section 2804. The image processing apparatus 2170 enlarges, for each region, the plurality of captured images represented in RAW format obtained by expansion, and performs synchronization processing for each region. During this operation, the image processing apparatus 2170 may perform higher definition synchronization processing on the characteristic regions than in the region other than the characteristic region.

The amount of operation increases if encoding using the model for the entire region of the image. Moreover the accuracy in reconstruction may be lowered if encoding by using the model also for regions of low importance. The image processing system 2020 may solve these problems.

With reference to FIG. 15 through FIG. 25, the image processing for calculating the character parameter by the image processing apparatus 2120 using the model, transmitting the calculated character parameter to the image processing apparatus 2170, and decoding the image of the characteristic region by the image generating section 2380 using the character parameter was explained. Regarding this image processing, the high image quality processing may be performed by the image generating section 380 on the image obtained by the image generating section 2380. That is, the output image outputted from the image generating section 2380 is inputted to the image processing apparatus 170, thereby generating a high image quality image. In this case, the image processing apparatus 170 does not have to include the correspondence analyzing section, the characteristic region information obtaining section 360, the expansion control section 310, the characteristic region information obtaining section 360, or the expanding section 320, and can generate the high image quality image from the output image obtained from the image generating section 2380, by means of the function of the image obtaining section 301, the model storage section 350, and the image generating section 380.

Here, the model used by the image generating section 2380 may be different from the model used by the image generating section 380. The model used by the image generating section 2380 is the same model as used by the parameter value calculating section 2260, and is referred to as "second model" to make distinction from the model used by the image generating section 380. That is, the model storage section 2270 functions as a second model storage section that stores the second model representing an object by a character parameter.

The parameter value calculating section 2260 adapts an image of the object included in the image of the characteristic region in the captured image to a second model stored in the model storage section 2270, thereby calculating the value of the character parameter in the second model expressing the object included in the image of the characteristic region in the captured image. The output section 2207 functions as an intermediate output section that outputs the value of the character parameter calculated by the parameter value calculating section 2260 and the image of the region other than the characteristic region in the captured image.

In this case, the image obtaining section 2301 functions as an intermediate image obtaining section that obtains the image of the region other than the characteristic region in the captured image whose image quality has been lowered and the value of the character parameter outputted from the output section 207. The image generating section 380 functions as an intermediate image generating section that generates the image of the object included in the image of the characteristic region in the captured image, from the second model based on the value of the character parameter. The output section 2340 functions as an image output section that outputs an image obtained by combining the image of the object generated from the second model and the image of the region other than the characteristic region obtained by the image obtaining section 2301.

The image obtaining section 301 obtains the image outputted from the output section 2340, as an input image. Then, the image generating section 380 generates a high image quality image of the image of the object included in the characteristic region in the input image obtained by the image obtaining section 301, by adapting the image to a model stored in the model storage section 350.

Figure 26:
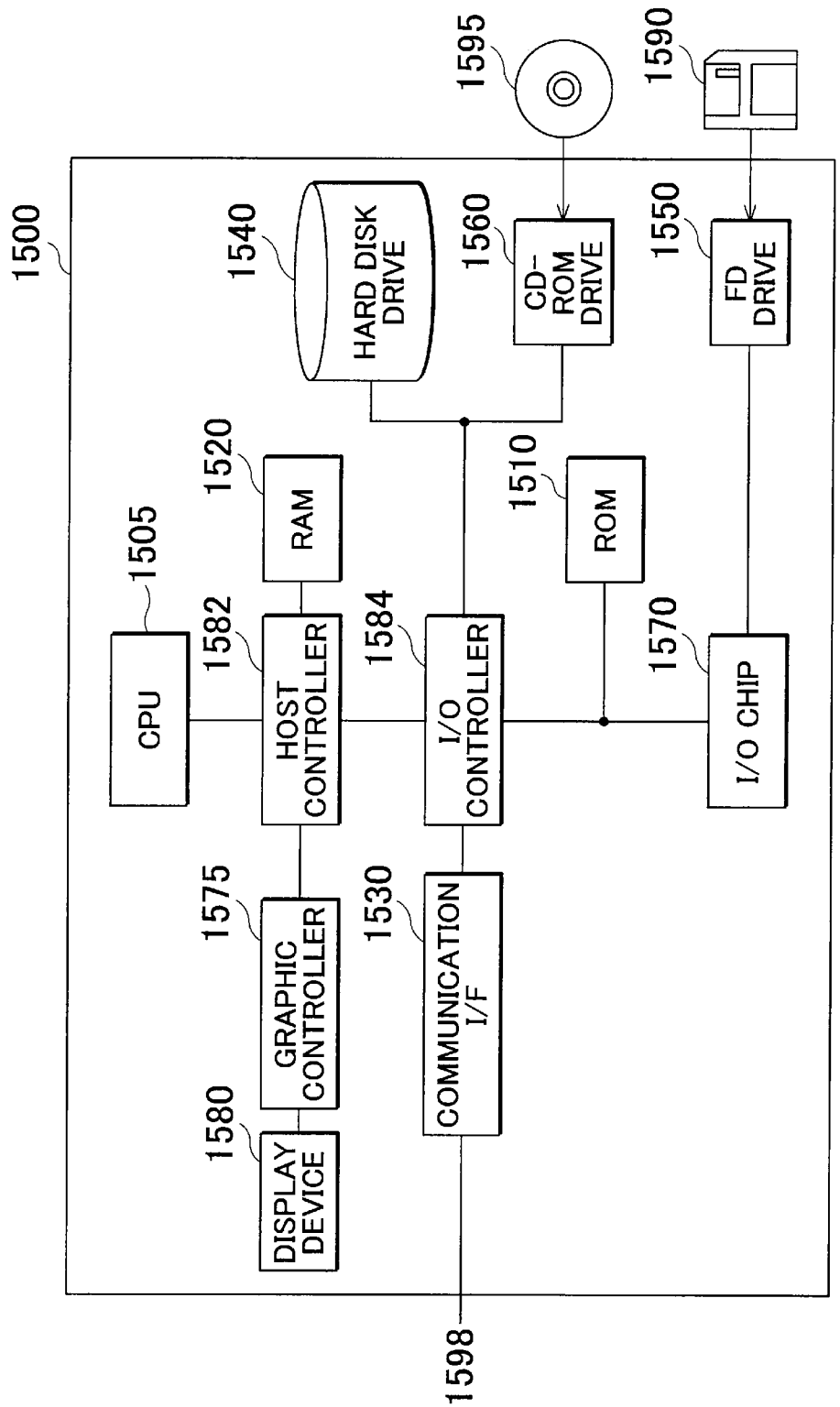
FIG. 26 shows an example of a hardware configuration of a computer 1500 functioning as an image processing apparatus 120, an image processing apparatus 170, an image processing apparatus 2120, and an image processing apparatus 2170.

FIG. 26 shows an example of a hardware configuration of a computer 1500 functioning as at least one of an image processing apparatus 120, an image processing apparatus 170, an image processing apparatus 2120, and an image processing apparatus 2170. The computer 1500 includes a CPU peripheral section, an input/output section, and a legacy input/output section. The CPU peripheral section includes a CPU 1505, a RAM 1520, a graphic controller 1575, and a display device 1580 connected to each other by a host controller 1582. The input/output section includes a communication interface 1530, a hard disk drive 1540, and a CD-ROM drive 1560, all of which are connected to the host controller 1582 by an input/output controller 1584. The legacy input/output section includes a ROM 1510, a flexible disk drive 1550, and an input/output chip 1570, all of which are connected to the input/output controller 1584.

The host controller 1582 is connected to the RAM 1520 and is also connected to the CPU 1505 and the graphic controller 1575 accessing the RAM 1520 at a high transfer rate. The CPU 1505 operates to control each section based on programs stored in the ROM 1510 and the RAM 1520. The graphic controller 1575 obtains image data generated by the CPU 1505 or the like on a frame buffer provided inside the RAM 1520 and displays the image data in the display device 1580. Alternatively, the graphic controller 1575 may internally include the frame buffer storing the image data generated by the CPU 1505 or the like.

The input/output controller 1584 connects the communication interface 1530 serving as a relatively high speed input/output apparatus, the hard disk drive 1540, and the CD-ROM drive 1560 to the host controller 1582. The hard disk drive 1540 stores the programs and data used by the CPU 1505. The communication interface 1530 transmits or receives programs and data by connecting to the network communication apparatus 1598. The CD-ROM drive 1560 reads the programs and data from a CD-ROM 1595 and provides the read programs and data to the hard disk drive 1540 and to the communication interface 1530 via the RAM 1520.

Furthermore, the input/output controller 1584 is connected to the ROM 1510, and is also connected to the flexible disk drive 1550 and the input/output chip 1570 serving as a relatively low speed input/output apparatus. The ROM 1510 stores a boot program executed when the computer 1500 starts up, a program relying on the hardware of the computer 1500, and so on. The flexible disk drive 1550 reads programs or data from a flexible disk 1590 and supplies the read programs or data to the hard disk drive 1540 and to the communication interface 1530 via the RAM 1520. The input/output chip 1570 is connected to a variety of input/output apparatuses via the flexible disk drive 1550, and a parallel port, a serial port, a keyboard port, a mouse port, or the like, for example.

A program executed by the CPU 1505 is supplied by a user by being stored in a recording medium such as the flexible disk 1590, the CD-ROM 1595, or an IC card. The program may be stored in the recording medium either in a decompressed condition or a compressed condition. The program is installed via the recording medium to the hard disk drive 1540, and is read by the RAM 1520 to be executed by the CPU 1505. The program executed by the CPU 1505 causes the computer 1500 to function as each constituting element of the image processing apparatus 120 explained with reference to FIGS. 1 through 14. The program executed by the CPU 1505 causes the computer 1500 to function as each constituting element of the image processing apparatus 170 explained with reference to FIGS. 1 through 14. The program executed by the CPU 1505 causes the computer 1500 to function as each constituting element of the image processing apparatus 2120 explained with reference to FIGS. 15 through 24. The program executed by the CPU 1505 causes the computer 1500 to function as each constituting element of the image processing apparatus 2170 explained with reference to FIGS. 15 through 24.

The programs shown above may be stored in an external storage medium. In addition to the flexible disk 1590 and the CD-ROM 1595, an optical recording medium such as a DVD or PD, a magnetooptical medium such as an MD, a tape medium, a semiconductor memory such as an IC card, or the like can be used as the recording medium. Furthermore, a storage apparatus such as a hard disk or a RAM disposed in a server system connected to a dedicated communication network or the Internet may be used as the storage medium and the programs may be provided to the computer 1500 functioning as the image processing apparatuses 120, 170, 2120, and 2170 via the network. In this way, the computer 1500 controlled by a program functions as the image processing apparatuses 120, 170, 2120, and 2170.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An image processing system comprising:
an image obtaining section that obtains an input image having been captured;
a characteristic region information obtaining section that obtains information indicating a characteristic region in the input image;
a model storage section that stores a model representing an object by a character parameter;
an image generating section that converts an image of an object included in the characteristic region in the input image into a high image quality image having an image quality higher than an image quality of the input image, by adapting the image of the object included in the characteristic region in the input image to the model; and
an output section that outputs an image including the high image quality image and an image of a region other than the characteristic region wherein
the model storage section stores the model representing an object by a statistical character parameter,
the characteristic region information obtaining section obtains information indicating a type of an object included in the characteristic region in the input image,
the model storage section stores models of different types of objects, in association with the respective types, and
the image generating section converts an image of the object included in the characteristic region in the input image into the high image quality image, by adapting the image of the object included in the characteristic region in the input image to a model stored in the model storage section in association with the type of the object included in the characteristic region indicated by the information obtained by the characteristic region information obtaining section.

2. An image processing system comprising:
an image obtaining section that obtains an input image having been captured;
a characteristic region information obtaining section that obtains information indicating a characteristic region in the input image;
a model storage section that stores a model representing an object by a character parameter;
an image generating section that converts an image of an object included in the characteristic region in the input image into a high image quality image having an image quality higher than an image quality of the input image, by adapting the image of the object included in the characteristic region in the input image to the model; and
an output section that outputs an image including the high image quality image and an image of a region other than the characteristic region, wherein
the model storage section stores the model representing an object by a principal component based on a principal component analysis,
the characteristic region information obtaining section obtains information indicating a type of an object included in the characteristic region in the input image,
the model storage section stores models of different types of objects, in association with the respective types, and
the image generating section converts an image of the object included in the characteristic region in the input image into the high image quality image, by adapting the image of the object included in the characteristic region in the input image to a model stored in the model storage section in association with the type of the object included in the characteristic region indicated by the information obtained by the characteristic region information obtaining section.

3. The image processing system according to claim 2, wherein
the model storage section stores the model representing a form of an object by a principal component based on a principal component analysis.

4. The image processing system according to claim 2, wherein
the model storage section stores the model representing a color of an object by a principal component based on a principal component analysis.

5. The image processing system according to claim 2, further comprising:
a direction identifying section that identifies a direction in which an object included in the characteristic region in the input image has been captured, wherein
the model storage section stores models of an object viewed in respectively different directions, in association with the respective directions, and
the image generating section converts an image of the object included in the characteristic region in the input image into the high image quality image, by adapting the image of the object included in the characteristic region in the input image to a model stored in the model storage section in association with the direction identified by the direction identifying section.

6. The image processing system according to claim 2, further comprising:
an illumination condition identifying section that identifies an illumination condition under which the object included in the characteristic region in the input image has been illuminated, wherein
the model storage section stores models of an object illuminated under respectively different illumination conditions, in association with the respective illumination conditions, and
the image generating section converts an image of the object included in the characteristic region in the input image into the high image quality image, by adapting the image of the object included in the characteristic region in the input image to a model stored in the model storage section in association with the illumination condition identified by the illumination condition identifying section.

7. The image processing system according to claim 2, wherein
the image generating section generates the high image quality image having a higher resolution than the input image, by adapting the image of the object included in the characteristic region in the input image to the model.

8. The image processing system according to claim 2, wherein
the image generating section enlarges an image of a region other than the characteristic region in the input image to an image of a same resolution as the high image quality image, and generates a single image by combining the enlarged image and the high image quality image.

9. The image processing system according to claim 2, wherein
the image obtaining section obtains the input image generated by lowering an image quality of a captured image, and the characteristic region information obtaining section obtains information indicating a position of a characteristic region detected from the captured image.

10. The image processing system according to claim 9, further comprising:
a characteristic region detecting section that detects a characteristic region from the captured image;
a compression section that generates the input image by lowering the image quality of the captured image; and
an input image output section that outputs the input image in association with information indicating the position of the characteristic region detected form the captured image, wherein
the image obtaining section obtains the input image outputted from the input image output section, and
the characteristic region information obtaining section obtains the information indicating the position of the characteristic region outputted in association with the input image from the input image output section.

11. The image processing system according to claim 10, wherein
the compression section generates the input image by changing an image quality of an image of a region other than the characteristic region in the captured image from an image quality of the image of the characteristic region.

12. The image processing system according to claim 11, wherein
the compression section generates the input image by lowering the image quality of the image of the region other than the characteristic region in the captured image than the image quality of the image of the characteristic region.

13. The image processing system according to claim 12, wherein
the characteristic region detecting section detects a plurality of characteristic regions from the captured image, and
the compression section generates the input image by lowering an image quality of images of the plurality of characteristic regions in the captured image down to an image quality determined in advance according to respective characteristics of the plurality of characteristic regions.

14. The image processing system according to claim 13, wherein
the characteristic region detecting section detects, from the captured image, a plurality of characteristic regions including respectively different types of captured objects, and
the compression section generates the input image by lowering the image quality of the images of the plurality of characteristic regions in the captured image down to an image quality determined in advance according to respective types of objects included in the plurality of characteristic regions.

15. The image processing system according to claim 13, further comprising:
an image quality obtaining section that obtains an image quality in association with a characteristic of each characteristic region, wherein
the compression section generates the input image by lowering the image quality of the images of the plurality of characteristic regions in the captured image down to the image quality obtained by the image quality obtaining section in association with the characteristic of each characteristic region.

16. The image processing system according to claim 10, wherein
the compression section generates the input image by lowering at least one of resolution of the captured image, a number of gradations of the captured image, a number of colors of the captured image, and a spatial frequency component of a spatial frequency region higher than a predetermined spatial frequency.

17. The image processing system according to claim 1, further comprising:
a second model storage section that stores a second model representing an object by a character parameter;
a characteristic region detecting section that detects a characteristic region from a captured image;
a parameter value calculating section that calculates a value of a character parameter of a second model representing an object included in an image of the characteristic region in the captured image, by adapting the image of the object included in the image of the characteristic region in the captured image to the second model stored in the second model storage section;
an intermediate output section that outputs the value of the character parameter calculated by the parameter value calculating section and an image of a region other than the characteristic region in the captured image;
an intermediate image obtaining section that obtains the image of the region other than the characteristic region in the captured image whose image quality has been lowered and the value of the character parameter outputted from the intermediate output section;
an intermediate image generating section that generates the image of the object included in the image of the characteristic region in the captured image, from the second model based on the value of the character parameter; and
an image output section that outputs an image obtained by combining the image of the object generated from the second model and the image of the region other than the characteristic region obtained by the intermediate image obtaining section, wherein
the image obtaining section obtains the image outputted from the image output section as the input image.

18. The image processing system according to claim 17, further comprising:
a compression section that compresses the image of the region other than the characteristic region in the captured image by lowering the image quality of the image of the region other than the characteristic region in the captured image, wherein
the intermediate output section outputs the value of the character parameter calculated by the parameter value calculating section and the image of the region other than the characteristic region whose image quality has been lowered by the compression section.

19. The image processing system according to claim 18, wherein
the second model storage section stores the second model representing an object by a statistical character parameter.

20. The image processing system according to claim 1, wherein
the image obtaining section obtains an input moving image including a plurality of moving image constituting images,
the characteristic region information obtaining section obtains information indicating a position of a characteristic region in each of the plurality of moving image constituting images, the image processing system further comprises a characteristic region selecting section that selects a first characteristic region and a second characteristic region having correlation higher than a value determined in advance, from among the characteristic regions of the plurality of moving image constituting images, and the image generating section converts an image of an object included in the first characteristic region and an image of an object included in the second characteristic region into a first high image quality image and a second high image quality image, by respectively adapting the image of the object included in the first characteristic region and the image of the object included in the second characteristic region to the model, and generates the high image quality image having a higher resolution than the image of the object included in the first characteristic region and the image of the object included in the second characteristic region, by using the first high image quality image, the second high image quality image, and a difference in position between the first characteristic region and the second characteristic region.

21. The image processing system according to claim 20, wherein the image generating section generates the high image quality image by combining the first high image quality image and the second high image quality image based on the difference in position.

22. The image processing system according to claim 21, wherein the image generating section generates the high image quality image by overlapping the first high image quality image and the second high image quality image by displacing the first high image quality image and the second high image quality image by the difference in position.

23. An image processing system comprising:

an image obtaining section that obtains an input image;

a characteristic region information obtaining section that obtains information indicating a characteristic region in the input image;

an object image information storage section that stores a high frequency component of an image of an object in association with a type of the object; and an image generating section that converts an image of each of a plurality of objects included in the input image, into a higher image quality image, by using a high frequency component stored in the object image information storage section in association with a type of the object, wherein the object image information storage section stores the information indicating the characteristic region in the input image by a statistical character parameter, the characteristic region information obtaining section obtains information indicating a type of an object included in the characteristic region in the input image, the object image information storage section stores object image information of different types of objects, in association with the respective types, and the image generating section converts the image of the object included in the characteristic region in the input image into the high image quality image, by adapting the image of the object included in the characteristic region in the input image to object image information stored in the object image information storage section in association with the type of the object included in the characteristic region indicated by the information obtained by the characteristic region information obtaining section.

* * * * *